United States Patent [19]
Brodsky et al.

[11] Patent Number: 5,804,936
[45] Date of Patent: Sep. 8, 1998

[54] MOTOR CONTROLLED SURGICAL SYSTEM

[75] Inventors: Michael A. Brodsky, Hillsboro; Kenneth W. Krause, Sandown, both of N.H.

[73] Assignee: Smith & Nephew, Inc., Andover, Mass.

[21] Appl. No.: 630,358

[22] Filed: Apr. 10, 1996

Related U.S. Application Data

[60] Provisional application No. 60/007,133, Oct. 31, 1995.

[51] Int. Cl.$^6$ .................................................... H02K 23/00
[52] U.S. Cl. ........................ 318/254; 318/138; 318/439; 318/560; 318/569; 318/600; 364/922
[58] Field of Search .................................... 318/560, 569, 318/600, 254, 138, 439; 364/922

[56] References Cited

U.S. PATENT DOCUMENTS

| | | | |
|---|---|---|---|
| 4,821,586 | 4/1989 | Scordato et al. | 364/922 X |
| 5,097,140 | 3/1992 | Crall | 318/560 X |
| 5,173,651 | 12/1992 | Buckley et al. | 318/600 X |

*Primary Examiner*—Karen Masih
*Attorney, Agent, or Firm*—Fish & Richardson P.C.

[57] ABSTRACT

A surgical system, adapted to operate with at least one surgical device, has a handpiece containing a motor which is adapted to receive the surgical device. The surgical device is driven through a continuum of positions by the motor output shaft. A controller microprocessor controls the operation of the system. The motor has addressable switch assemblies for generating electrical state signals and the controller is responsive to the state signals for controlling the operation of the motor. The addressable switch assemblies are addressable Hall-effect circuit switches connected to the controller over a two wire switch bus. In connection with an arthroscopic device, the system enables the surgeon to control operation of the device from the handpiece. The surgical control system also provides a more linear relationship between the duty cycle of a pulse width modulated control signal and the resulting motor armature rotational velocity.

5 Claims, 20 Drawing Sheets

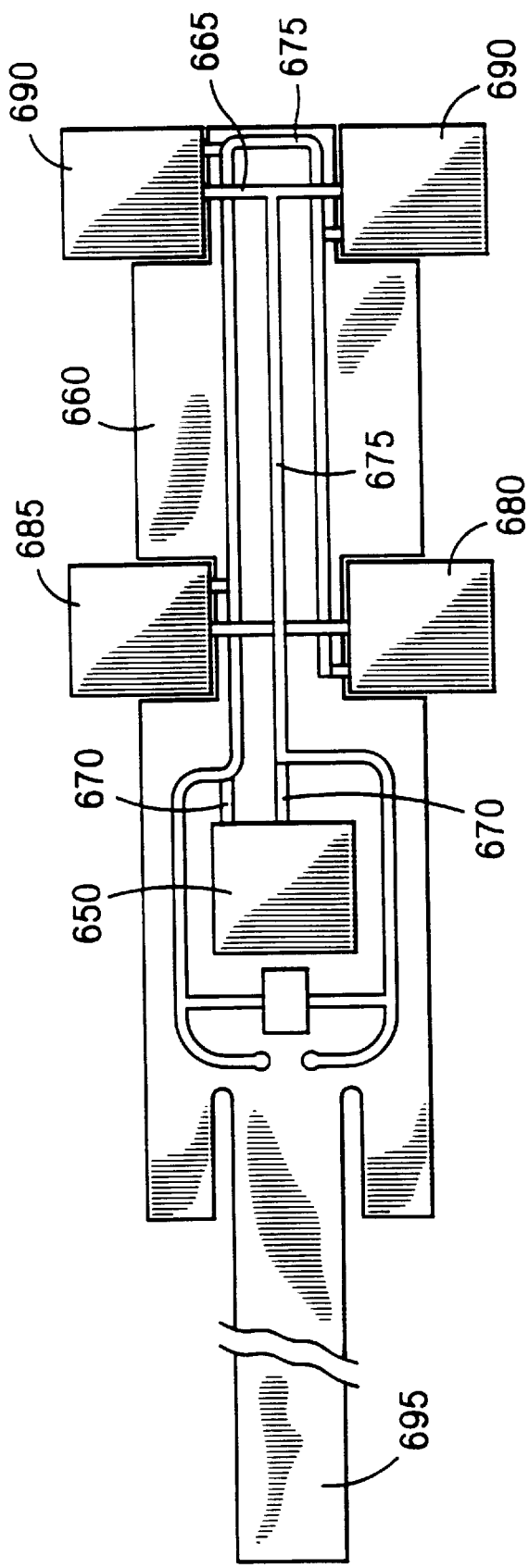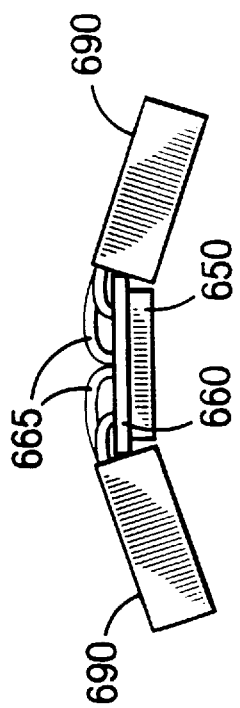
FIG.10E
FIG.10F

MOTOR CONTROLLED SURGICAL SYSTEM

This case claims priority from Brodsky et al, provisional application 60/007,133, filed Oct. 31, 1995, entitled MOTOR CONTROLLED SURGICAL SYSTEM.

BACKGROUND OF THE INVENTION

This invention generally relates to motor driven surgical systems, and more particularly, to a system for controlling the operation of an all digital motor controlled surgical system.

Digital speed control systems for controlling the rotational speed of brushless motors used, for example, with arthroscopic cutting devices are well known. These brushless motor controlled devices typically adapt to a surgical assembly and use an all digital, well defined, system such as that disclosed in U.S. Ser. No. 431,615, filed May 1, 1995 and U.S. Pat. No. 5,270,622. They provide excellent control over the rotational speed and position of the motor armature, which enables precise and accurate control of the surgical assembly through an appropriate gear reduction between motor and assembly. Such digital control systems provide an advancement over the prior analog controlled systems using, typically, brushless motors.

The surgical assembly includes a handpiece portion and a surgical device. The handpiece, which houses the brushless motor and its controls, connects to and drives the surgical device in one of a plurality of modes. Thus, for example, the surgical device can be driven in an oscillatory mode, can be driven to return to a known position, and can be driven at varying speeds. The handpiece is designed as a sealed unit so that fluids passing through the surgical device, and out of the handpiece, do not inadvertently leak into, and damage, the brushless motor.

As the surgical systems become more sophisticated, and in connection with various surgeries, such as arthroscopic surgery, which require equipment of small physical dimension, the competition for space within the handpiece increases. In addition, the surgeon prefers the "luxury" of having the controls for the motor at his fingertips rather than relying on either a third person to control the motor in response to his oral commands, such as at the control panel for the equipment, or relying solely on foot pedal controls which enable various operations to be accomplished. Further, in various known systems, electrical transducer sensor assemblies are placed both in the surgical device and in the handpiece, to enable the controller to adapt automatically to various classes of surgical device. All of the electrical transducing sensors, placed within the handpiece, compete for space within the handpiece, and importantly require electrical connection to the controller. The resulting electrical connecting cable thus grows in size as the handpiece sophistication and complexity increase.

In addition, there is the constant need, in the control of the brushless motor, to provide a highly stable, accurate, and preferably linear relationship between the control signals and the motor velocity and position. This is particularly important in connection with medical surgery since precise, reliable, and convenient control of the equipment often equates to the success of the operation.

SUMMARY OF THE INVENTION

A typical system, in accordance with the invention, has a digital signal processor or controller for supplying command signals indicative of a desired motor operation. The processor or controller generates, for each phase of motor drive, and in response to the external control signals, a digital commutation signal to rotate the motor armature. A digital pulse width modulated signal, having a duty cycle established by the control signals, controls, through a linear relationship control circuit, armature rotational speed.

The system has a switching element, for example a multi-phase bridge and driver, in digital communication with the controller. The bridge is operative for generating, for each phase, and in response to each commutation signal from the controller, a digital control signal having an on-state controlled by the commutation signal and a voltage magnitude corresponding to the duration (that is, duty cycle) of the pulse width modulated signal from the controller.

The system still further has elements in digital communication with the controller, for generating, as the motor rotates, position sensor signals indicative of motor armature position. The controller is operative for processing the position sensor signals to generate a digital signal indicative of the actual armature rotational speed.

In a particular aspect of the invention, a surgical system is adapted to operate with at least one surgical device. The surgical system has a handpiece containing a motor and the motor is adapted to receive and drive the surgical device. The surgical device is driven through a continuum of positions by the handpiece under the control of a controller. The surgical system features a controller for controlling the surgical device through a motor drive circuitry, addressable switches in the handpiece responsive to addressing signals from the controller over a switch bus for indicating a switch state (such as whether the switch is present, and its condition) and wherein the controller is responsive to the electrical signals from the switches over the switch bus for controlling operation of the motor drive.

In particular embodiments, each addressable switch has a Hall-effect sensor which responds to magnetic fields to generate a state signal to the controller, and a moveable switch element containing a source of magnetic energy. The controller is then responsive to the change of state of the Hall-effect sensor, in response to movement of, for example, manually moveable button magnets, for operating, at least in part, the driven motor, and thereby, the surgical device.

The surgical system further features at least one addressable Hall-effect device in electrical communication with the switch bus and positioned in the handpiece for responding to magnetic field generating elements in a surgical device inserted into the handpiece. The surgical device may then contain magnets at specified locations corresponding to the Hall-effect device(s). The controller is responsive to signals indicative of the state of at least one addressable Hall-effect device for presetting parameters of the surgical system which correspond to the recognized surgical device.

In a particular embodiment, the switch bus is a two-wire bus connecting each switch to the controller. In another aspect, the surgical system can have a foot switch connected to the controller for providing electrical signals identifying various foot switch commands. The foot switch features an addressable Hall-effect switch element and a manually actuated button element for modifying the state of the Hall-effect switch. The foot switch can thus indicate to the controller, when polled, a switch state; and the controller, in response to the switch state, thereby controlling operation of the driven motor.

BRIEF DESCRIPTION OF THE DRAWING

Other features and advantages of the invention will be apparent from the following description, taken together with the drawings in which:

FIG. 10E is a top view of a circuit board of the handpiece of FIG. 10A;

FIG. 10F is an end view of the circuit board of FIG. 10E;

DESCRIPTION OF PARTICULAR EMBODIMENTS

Figure 1:
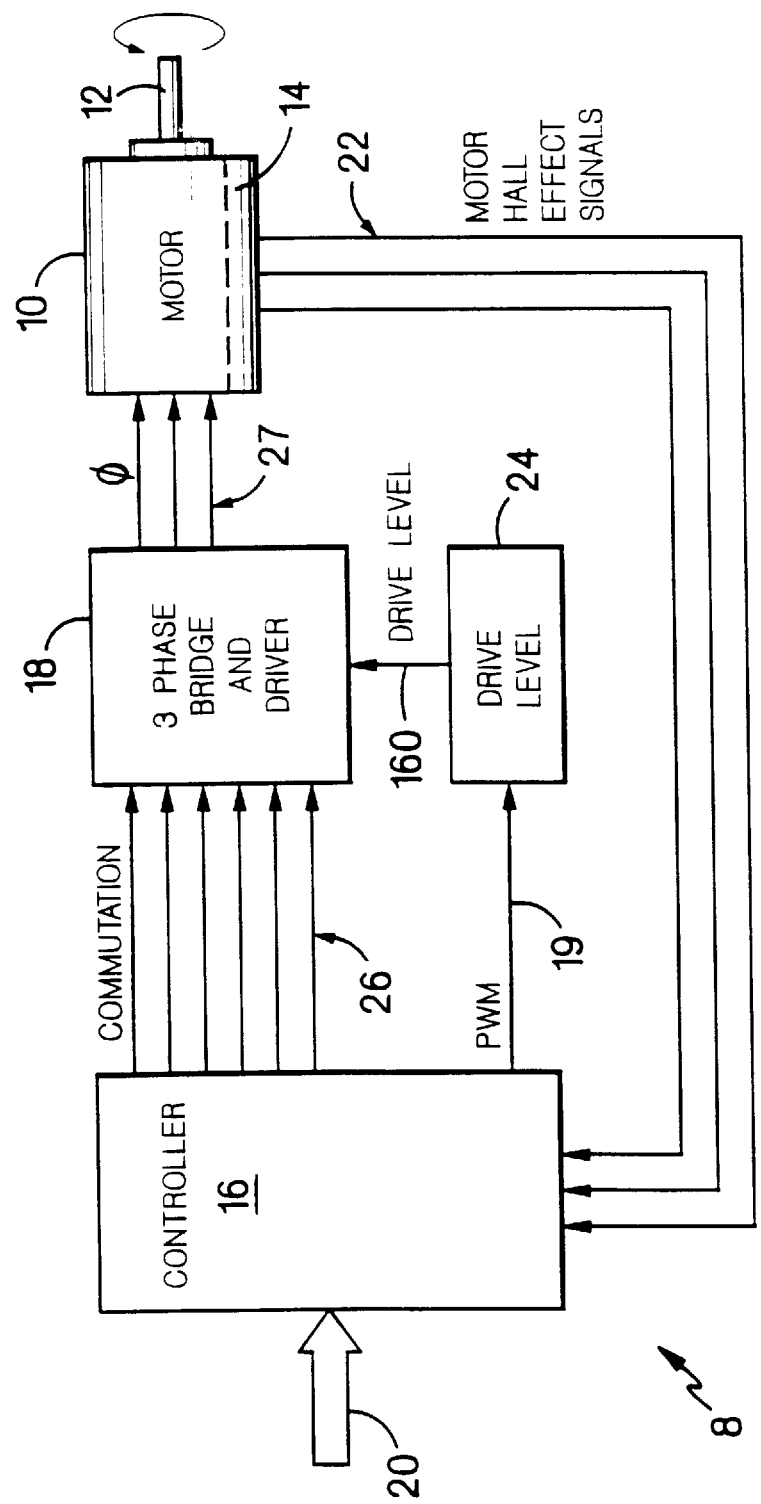
FIG. 1 is a general block diagram of the overall all-digital speed and position control system according to the invention.

Referring to FIG. 1, an all-digital motor control system 8 of this invention has a brushless, three-phase, DC motor 10 having a rotating armature 12. The motor has a plurality of conventional Hall-effect sensors 14 (three in the illustrated embodiment) mounted about the armature to sense armature position.

The system includes a digital signal processor or controller 16, preferably an integrated circuit chip manufactured by Philips, and sold as model number 87C552. Controller 16 connects to motor 10 through a three phase bridge and driver circuit 18. Controller 16 generates a digital speed signal over a line 19 indicative of a desired armature speed (based on operator signals over lines 20 as described in more detail below, and further based upon actual motor rotational speed, as will also be described in detail below, as determined from signals over lines 22 from the Hall-effect devices 14 in motor 10).

Figure 8:
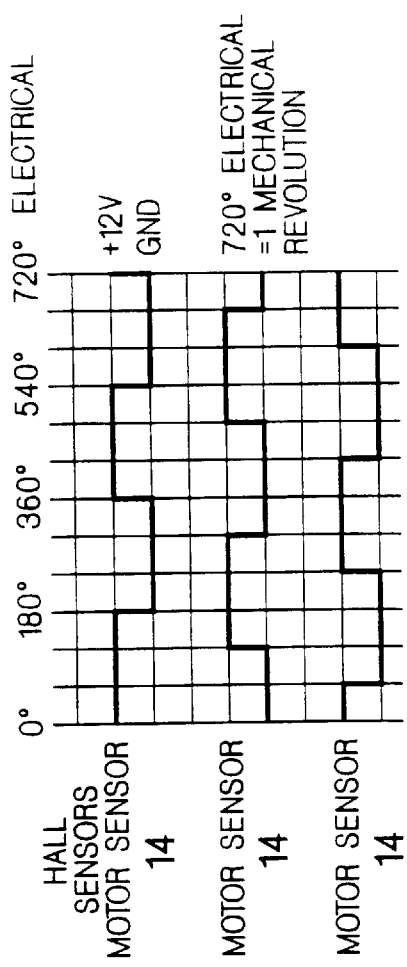
FIG. 8 depicts the motor Hall-effect switch outputs according to the invention.

Upon power turn-on, controller 16 executes a software program as set forth, in pertinent detail, on pages 1 through 23 of the attached Appendix A. Controller 16 generates a set of six commutation signals 26, two for each phase of the illustrated four pole brushless motor, together operative for rotating the motor armature. More specifically, the controller in the illustrated embodiment, includes in its program, a look-up table having a listing of six commutation bit patterns, each pattern representing a discrete command for the armature, as a function of the angular position of the armature, as determined by the signals from the motor Hall-effect devices 14. The commutation signals are fed through, and processed in, the three-phase bridge and drive circuit 18 whereby three position control signals, one for each phase of the motor drive, are output to the motor 10 over lines 27. (The Hall-effect sensors 14 sense rotation of the armature and generate two-state Hall-effect signals (illustrated in FIG. 8), in substantial response to which the controller 16 generates the commutation signals.)

Figure 3:
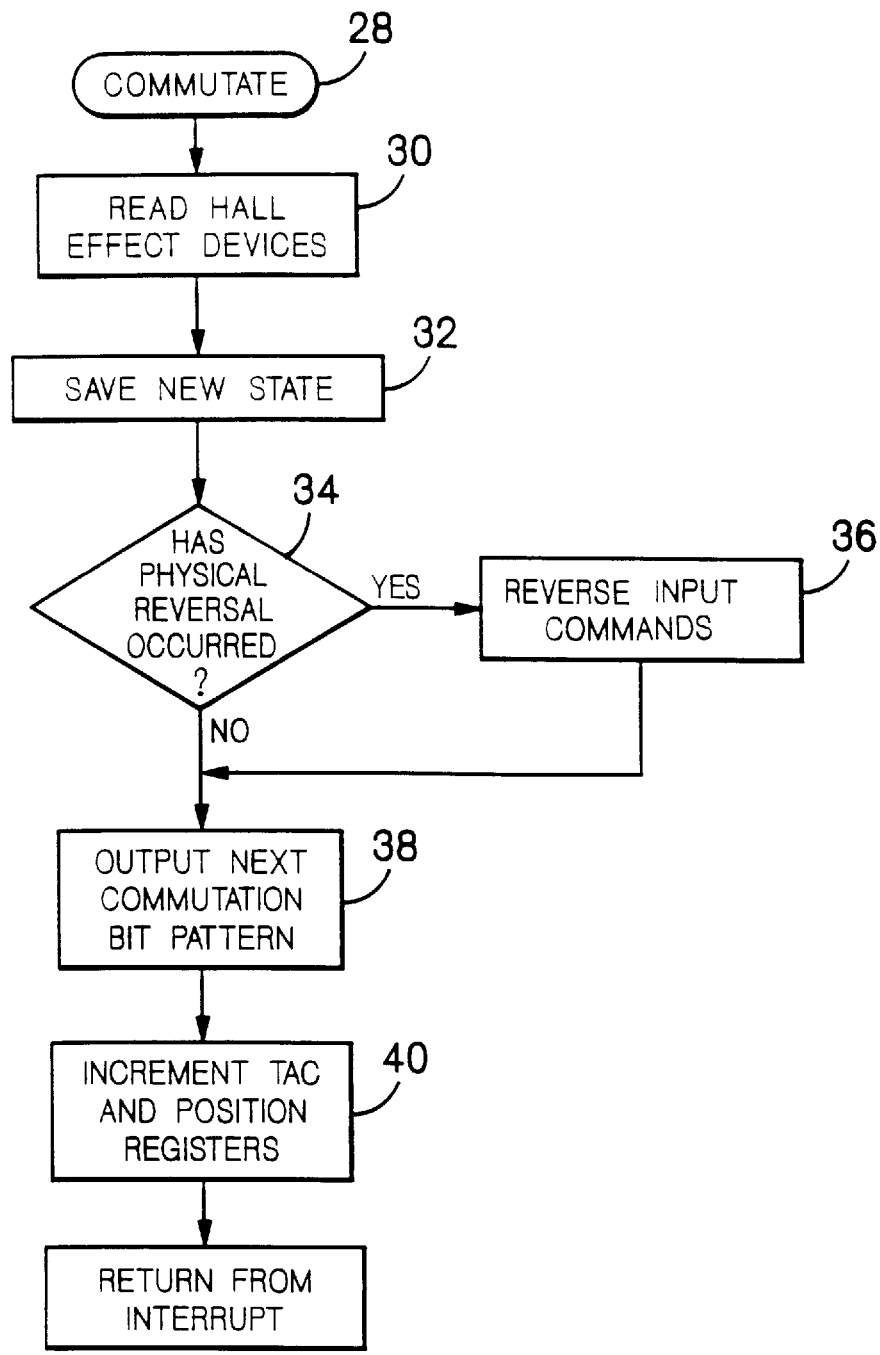
FIG. 3 is flow chart depicting part of the operation of the controller.

This latter aspect of the controller 16 is illustrated in the operational flow chart of FIG. 3. The generation of the commutation signals is indicated by block 28. The reading of the Hall-effect sensors is denoted by block 30. The newly read state of the Hall-effect sensors 14 is stored at 32. When the controller 16 recognizes that a physical reversal of the armature has occurred (block 34), the reverse input command is given (block 36) and the next commutation bit pattern is output to the motor (block 38). If no reversal has occurred, the commutation bit pattern is sent without passing through block 36 and the next commutation bit pattern at 38 is the same as the last one. Thereafter, an internal counter, operative for generating a tachometer (TAC) signal, and the position registers, are incremented (block 40). The controller then returns from the interrupt. (For the illustrated four pole (3 phase) motor, the bit pattern changes every 30° of armature mechanical rotation. (FIG. 8)) The tachometer signal is processed to generate the aforementioned speed signal.

Figure 4:
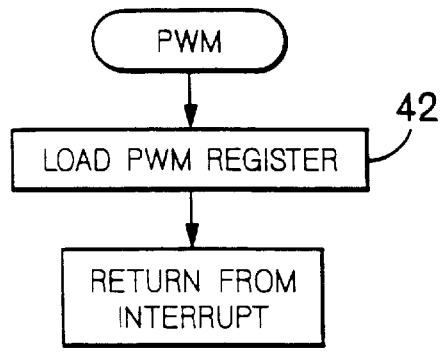
FIG. 4 is a flow chart depicting another aspect of the operation of the controller.

Referring to FIG. 4, controller 16 also generates, by loading a PWM register in response to the desired speed value, a digital pulse width modulated (PWM) signal having a duty cycle (or pulse width) dependent, in part, upon armature rotational velocity. (Block 42) The PWM signal, in the illustrated embodiment, has a fixed PWM cycle of 42.5 microseconds. The PWM signal has a high and a low state. The controller determines the duration of the PWM signal and hence the speed of the armature in the preferred case, from 0–42.5 $\mu$s. In this way, the duty cycle of the PWM signal is controlled from 0–100%.

Figure 2A:
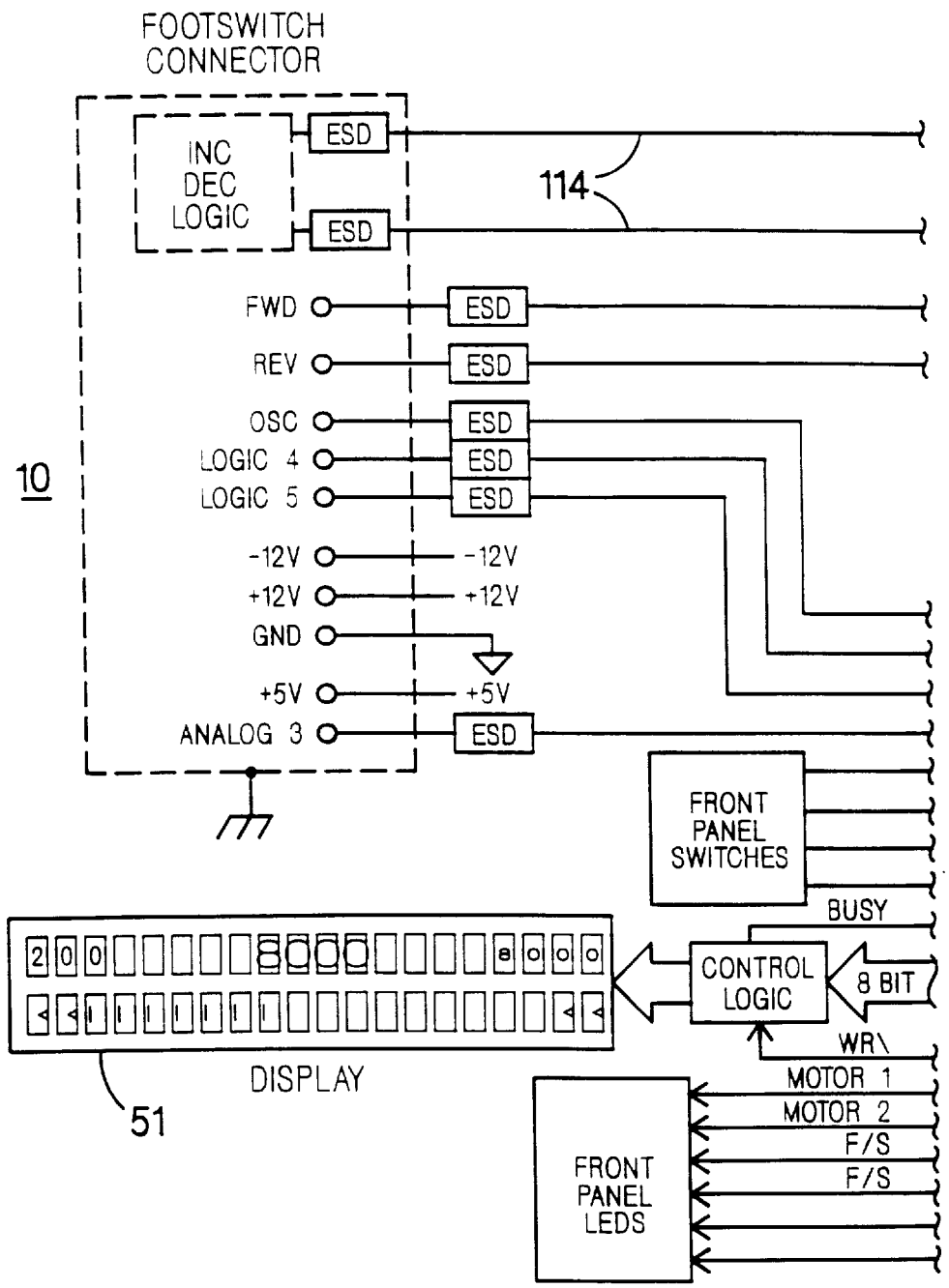
FIGS. 2A and 2B represent a detailed block diagram of a particular embodiment of the system of FIG. 1.
Figure 2B:
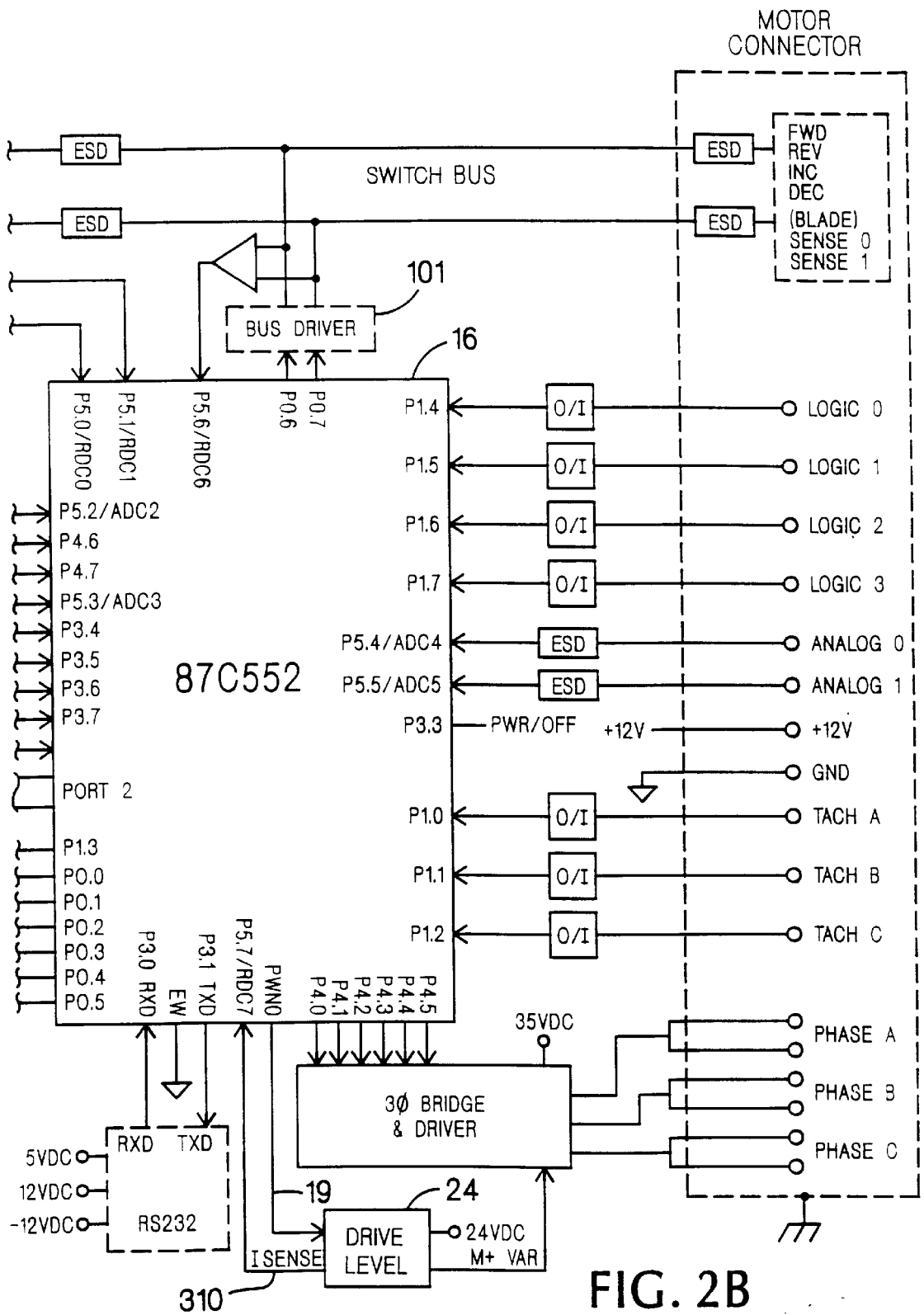

As shown in FIGS. 1 and 2A and 2B, the PWM signal is fed to the three phase bridge and drive circuitry 18 through a drive level circuit 24, and circuit 18 generates the switching signals for the three phase bridge portion of the circuit 18 as is well known in the art. In turn, the bridge portion generates, for each phase, the aforementioned motor control signals, over lines 27, each having an on-state and an off-state.

The Hall-effect sensors 14, as previously mentioned, generate and send relative position signals back to the controller where the signal changes are accumulated as they occur. The resulting counts from a TAC counter are processed by controller 16 to generate a tachometer signal which is delivered by the processor 16, inter alia, to a display 51 and which is indicative of the actual rotational speed of the motor.

Figure 5:
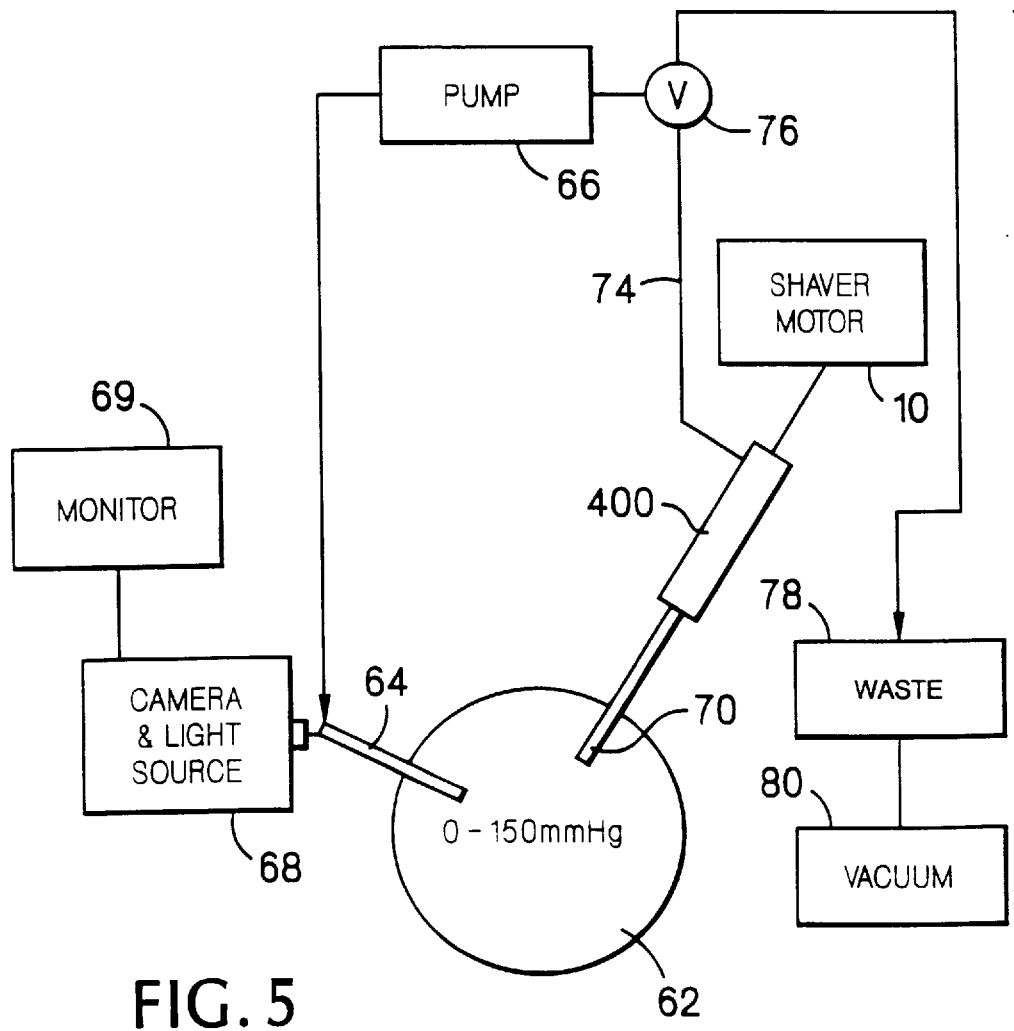
FIG. 5 is a schematic block diagram of a surgical procedure, using the system of the invention.

FIG. 5 is a schematic block diagram showing a setup of a typical modern surgical procedure, for example, an arthroscopy or laparoscopy. A joint or another area of the patient being operated on is diagrammatically illustrated at 62. A first cannula 64 is introduced into the area and is attached to a source of saline solution. A pump 66 maintains a positive pressure in the joint, for example 0 to 150 mm Hg gage. A video camera and light source 68 are also connected to the cannula 64 for viewing the area and displaying the image on a television monitor 69. A second cannula 70 with a surgical instrument at its end is also introduced into the area 62. The instrument, here, is driven by a handpiece 400 with a motor drive 10. The saline, blood and debris from the cutting are removed from the area through a hollow in the cannula 70 and then through a hose 74 which passes to a pinch valve 76, located on the pump housing 66, and which can help regulate flow from the area. The effluent then passes to a waste collector 78 and to a vacuum source 80 which typically maintains a pressure of 150 to 760 mm Hg absolute. Between the cannula 70 and hose 74 is the handpiece 400 of a surgical device.

Figure 6:
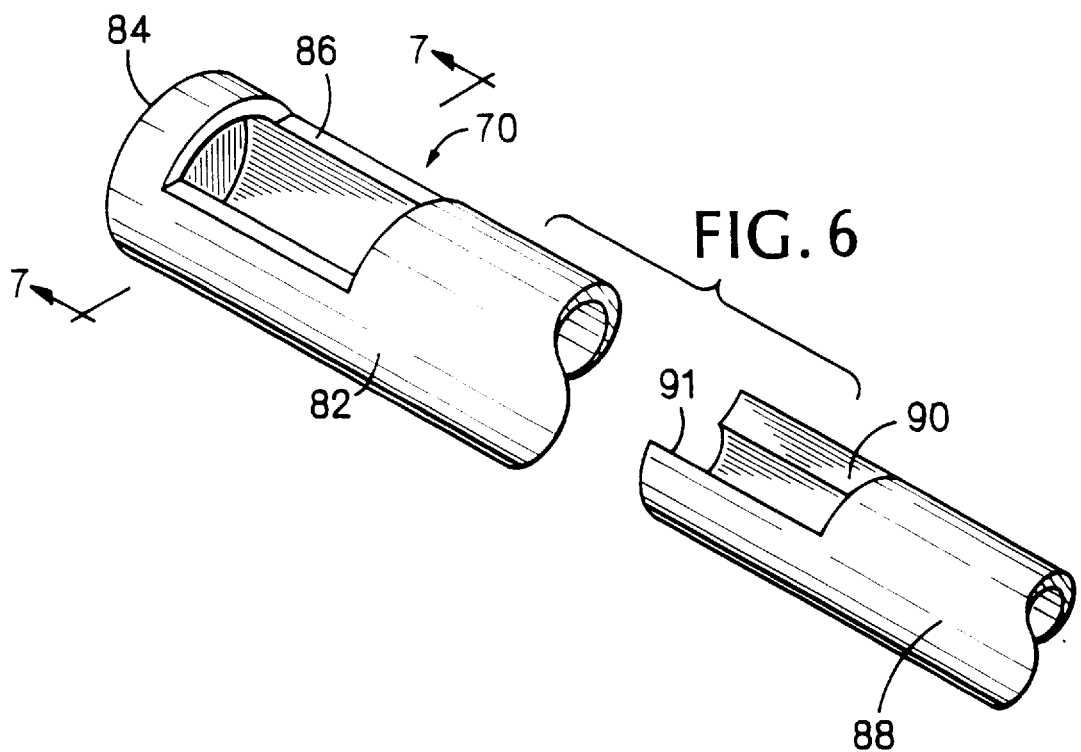
FIG. 6 is a perspective view of a surgical tool.

FIG. 6 is a schematic perspective, partially cut away, exploded view of part of a surgical device, a blade assembly, which would appear at the end of the cannula 70. A fixed hollow tube 82 of the blade assembly, closed at its distal end 84, has an opening which describes typically a cut-out section 86. The rotatable inner blade 88, also a hollow tube, has a cutting surface with sharp edges 91 at its distal end region 90. The inner blade is driven by the motor and rotates inside the tube 82 which is securely housed in the motor assembly. The vacuum draws fluids and debris through the central hollow for removal.

The inner blade is typically driven at a constant speed, and rotates either in a continuous, single direction, mode, or in an oscillatory mode. The inner blade is driven by the motor within the shaver 72 corresponding to motor 10. It is desirable to control accurately the torque applied to the inner blade, because if the torque is too large, for example due to a piece of bone or metal or other fragment getting caught in the spinning tube of the inner blade 88, the inner blade itself or the tube 82, or the cannula 70 may shatter with the result of spraying debris into the patient's joint. The debris, then, must be removed which is not an easy task. Also, there is the resulting attendant trauma to the region. The control system of the present invention provides such a torque control.

As noted above, the system of the present invention applies a voltage or electrical drive energy, for example, a series of pulses with a varying magnitude, to the brushless motor. The tachometer signals measure the actual speed of the motor armature, as noted above, and compares the desired armature rotational speed with the actual output speed derived from the Hall-effect sensor waveforms (FIG. 8) from the driven motor. If an object becomes stuck inside the surgical device, the motor will normally need more power, and thus will call for an increased duty cycle (over line 19) in the form of more average voltage and/or current (over lines 27). The software, however, compares the actual speed of the motor with the commanded speed of the motor, and if the speed is too slow for the applied voltage, then the controller will decrease the duty cycle, (which correspondingly reduces the average voltage or current to the motor), and this will reduce the motor torque, and thus will avoid possible fracture of the inner blade 88 or the tube 82. The surgeon may then observe the condition at the end of the cannula through the camera 68; and if something is stuck, increase the flow of saline or manipulate the tool to remove the clogging. It is also desirable in this situation to stop the tool with the aperture open. As described in pending application Ser. No. 08/420,243, filed Apr. 11, 1995, the entire contents of which are incorporated herein by reference, this condition can be attained if originally preset into the system. If need be, also, the surgeon can change the tool.

Figure 7:
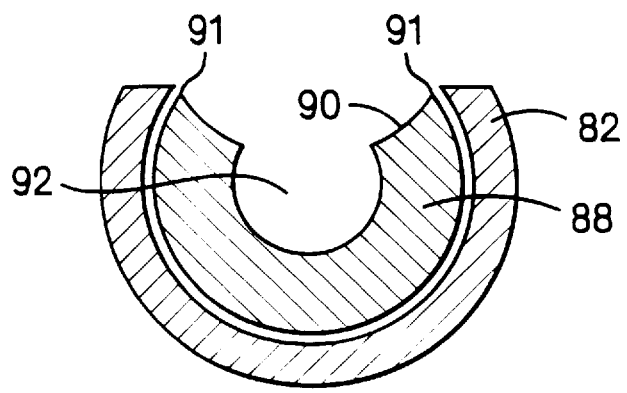
FIG. 7 is a cross-sectional view through FIG. 8.

FIG. 7 is a cross-sectional view through the cannula of FIG. 6 but with the inner blade inserted therein. The inner blade 82 with its cutting edge 91, can be driven to rotate one way, and then another, that is, to oscillate. For example, the system can drive the inner blade clockwise for 0.6 seconds, then counter-clockwise for 0.6 seconds, and thereafter repeat that process. As the inner blade body 88 rotates one way and then the other, tissue that moves into the opening 86 is cut, and is then removed by the action of the vacuum, by flushing the saline solution through the interior hollow aperture 92, which feeds ultimately to the hose 74.

It is understood that the oscillatory movement is not limited to rotary inner blades, but may be used for drills, circular rasps, rotary rotating scalpels, and a full range of motor driven tools.

Figure 10A:
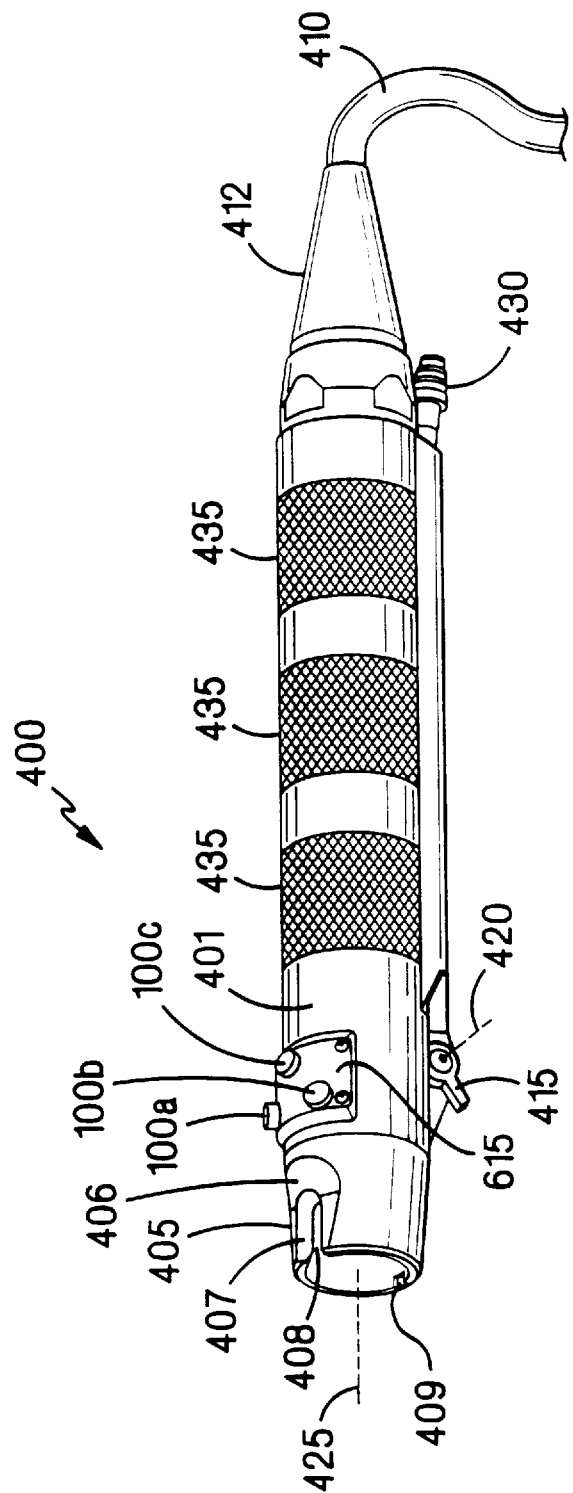
FIG. 10A is a perspective view of a surgical handpiece.

With reference to FIG. 10A, the surgical handpiece 400 is configured to accept a variety of disposable surgical cutting instruments. The handpiece has a generally cylindrical shape and includes a housing 401 made from aluminum. At its distal end, the handpiece includes a hollow interface portion 405 for attachment of a surgical instrument. The handpiece is fully autoclavable. (The handpiece and surgical instrument structure is described in greater detail in copending United States Application filed as a provisional application on Oct. 31, 1995, entitled SURGICAL SYSTEM and naming Douglas D. Sjostrom, Graham Smith, Steven Ek, and Paul A. Torrie as inventors, the contents of which, in their entirety, are incorporated herein by reference.

The interface portion 405 includes a recessed portion 406 having a slot 407 for insertion of the surgical instrument. An annular flange 408 within the interface portion 405 engages with the surgical instrument to axially secure the instrument to the handpiece 400. Annular flange 408 has a ramp-shaped leading edge and a back-cut trailing edge. A guide hole 409 radially secures the surgical instrument to the handpiece and prevents rotation of the surgical instrument.

Figure 10B:
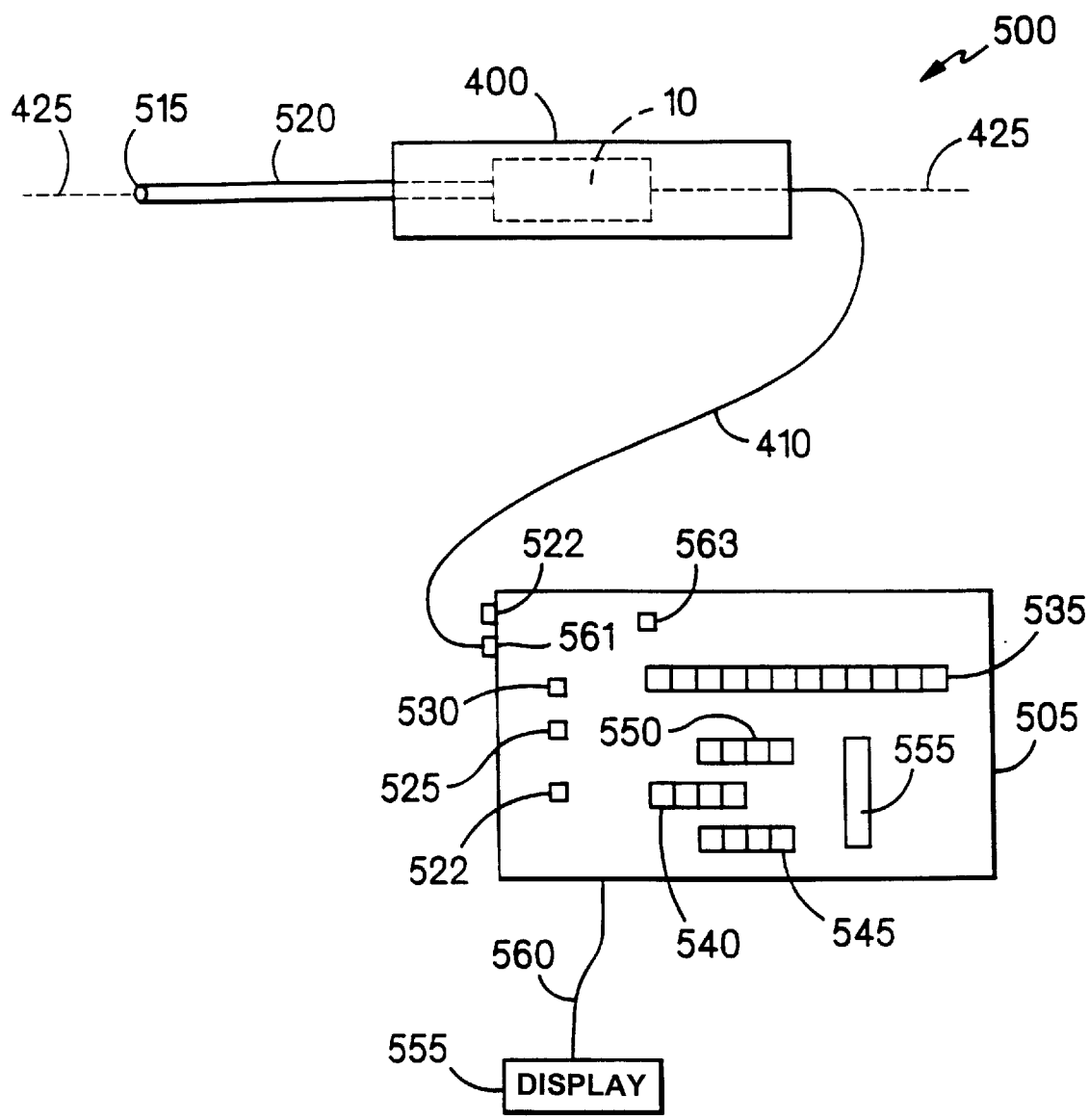
FIG. 10B is a block diagram of a surgical system including the handpiece of FIG. 10A.

Referring also to FIG. 10B, the handpiece 400 also includes, at its proximal end, a cable 410 for attachment to a console 505 of a surgical system 500. The cable 410 is connected to the handpiece by a threaded connector 412. Through the cable 410, the console 505 controls the operating speed and direction of the motor 10 located in the handpiece 400, and thereby controls the direction and speed at which the motor armature rotates.

As illustrated in FIG. 10B, the console 505 includes a power switch 522 for activating or deactivating the system, and buttons to increase (525) or decrease (530) the speed of the handpiece motor 10. To display information, the console includes a fluorescent display 535 for diagnostic messages, digital display of the motor speed (540) and the permissible range for the motor speed (545, 550), and a bar graph display 555 of the motor speed within the permissible range. A foot switch assembly 555 attached to the console 505 through a cable 560 permits an operator to select between forward, reverse and oscillate modes of operation for the motor 10 as well as the aperture locked mode of operation. Lines from both the footswitch and the handpiece are terminated at the console either by an optical isolation device (labelled O/I in FIG. 2B) or an electrostatic charge protection device (labelled ESD in FIGS. 2A and 2B). The console also includes a switch 563 to select one of two input connections 561, 562 to which a cable 410 can connect.

Figure 10C:
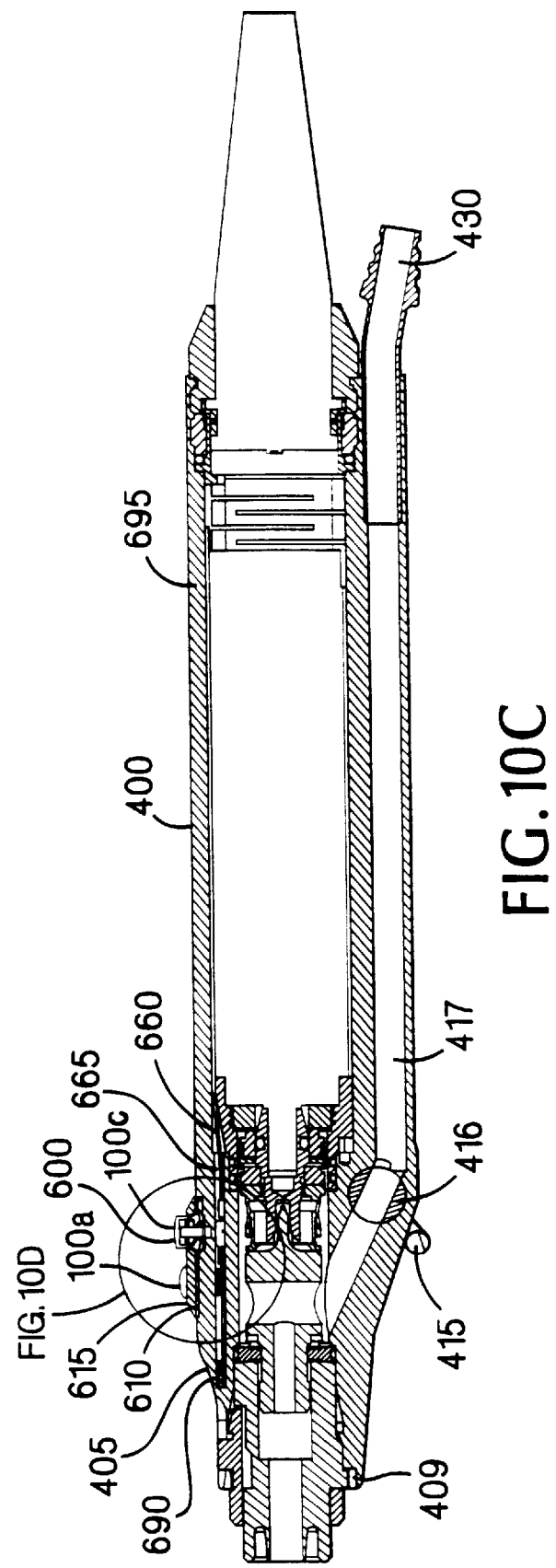
FIG. 10C is a side cross-sectional view of the surgical handpiece of FIG. 10A.
Figure 10D:
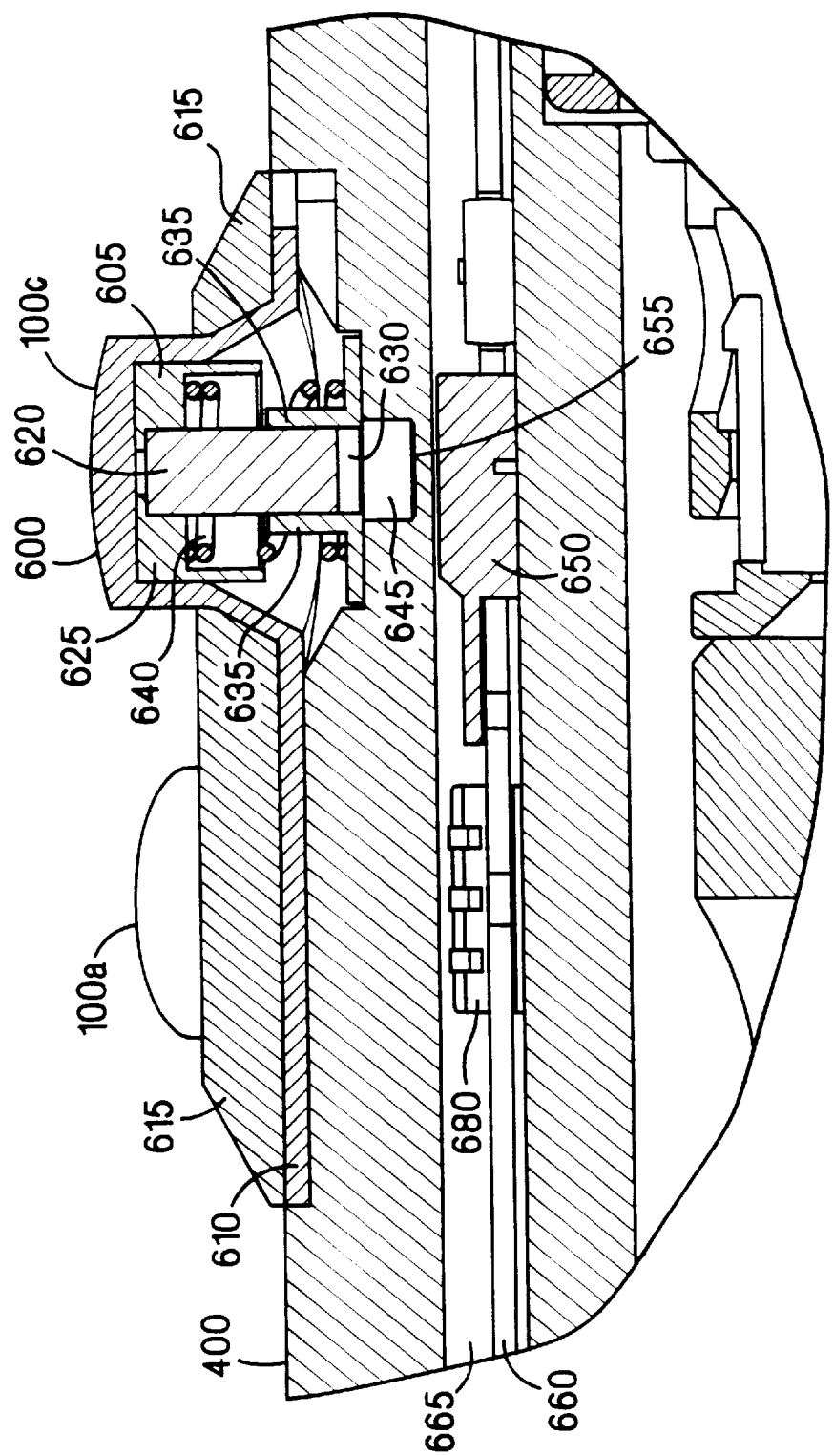
FIG. 10D is an enlarged portion of the cross-sectional view of FIG.10C.

Referring also to FIGS. 10C and 10D, the handpiece 400 also includes a handle 415 that controls a valve 416 and thereby controls an aspiration channel 417 through the handpiece 400. The handle 415 is positioned on the bottom of the handpiece near the distal end of the handpiece, and rotates about an axis 420 that is perpendicular to a longitudinal axis 425 of the handpiece. This orientation permits one-handed, finger control of flow through the aspiration channel 417 by a person holding the handpiece 400. The aspiration channel 417 ends at an aspiration spigot 430 at the proximal end of the handpiece.

Three textured bands 435 define arcs about the circumference of the handpiece 400. These bands provide ease of gripping, and are formed by scoring the outer surface of the handpiece.

Three push-button switches 100*a*, 100*b* and 100*c* are located near the distal end of the handpiece 400 and are arranged in a triangular configuration. The switches, which are round and identically sized, provide control signals to the controller 16 (FIG. 2B) through cable 410. The controller 16 uses the switch signals to control the motor 10 in the handpiece 400. In one embodiment, the switches cause the console to control the motor to: (1) cycle through forward, reverse and oscillate modes of operation, (2) cycle through a circular range of speeds and (3) activate or deactivate. In another embodiment, the switches respectively cause the console to control the motor to operate in (1) forward, (2) reverse or (3) oscillate modes. As described below, the controller can effect these different embodiments, with the same handpiece, without reprogramming of controller 16. In the latter configuration, pressing any one of the switches activates the motor and causes the motor to operate in the corresponding mode. Thereafter, pressing any switch deactivates the motor. To switch, for example, from the forward operating mode to the reverse operating mode, an operator would press any one of the three switches to deactivate the motor and would thereafter press the reverse switch to reactivate the motor in the reverse mode. When the switches 100*a*, 100*b*, 100*c*, respectively cause the controller 16 to control the motor 10 to operate in the forward, reverse or oscillate modes, the aperture foot switch assembly provides redundant controls and, except for the aperture locked mode, is unnecessary.

Each of switches 100*a*, 100*b*, and 100*c* includes a rubber boot 600 positioned over a magnetic switching element 605. The rubber boots 600 are formed in a sheet of silicone rubber 610 that is secured to the housing 401 of handpiece 400 by a metal cover 615. Each magnetic switching element 605 includes a magnet 620 that is secured to a stainless steel switch cover 625 and positioned within a cylindrical opening 630 of a stainless steel switch bottom 635. A spring 640 biases the switch cover 625 away from the switch bottom 635, and rubber boot 600 maintains the switching element 605 as a single unit.

Depressing switch 100*c* causes the magnet 620 to extend beyond switch bottom 635 into a depression 645 in the housing 401 of the handpiece 400. As noted above, switch bottom 635 is made from stainless steel, a magnetically soft material that absorbs the magnetic field produced by magnet 620 and thereby shields the magnet 620. By contrast, the housing 401 of the handpiece 400 is made from aluminum, a material that does not absorb the magnetic field and does not shield the magnet 620. Thus, depressing switch 100*c* causes a portion of the magnet 620 to move from a shielded position to an unshielded position.

When switch 100*c* is depressed and magnet 620 is extended into depression 645, the magnetic field produced by magnet 620 is sensed by a Hall-effect sensor 650. The Hall-effect sensor 650 is physically isolated from the magnet 620 by a portion 655 of the housing 401 of the handpiece 400, which provides a barrier against any potential leakage path through the switch 100*c*. However, because the housing 401 is made from aluminum, and does not absorb the magnetic field produced by magnet 620, the Hall-effect sensor 650 is not magnetically isolated from the magnet 620 when the magnet 320 is positioned in the depression 645. Similar results could be obtained if the housing 401 were made from another non-magnetic material such as plastic or Austenitic non-magnetic stainless steel.

The Hall-effect sensor 650 responds to the magnetic field as described hereinafter. The sensor includes a high-resolution bipolar Hall-effect switching circuit that drives high-density CMOS logic stages. The logic stages decode serial address pulses on the switch bus and produce a response when an appropriate address is received. This response is indicative of whether the Hall-effect sensor has detected a magnetic field.

Referring to FIGS. 10E and 10F, Hall-effect sensor 650 is mounted on a circuit board 660 that is positioned in a channel 665 in the housing of the handpiece 400. The board 660 is flat, 15 mils thick, and only slightly flexible. Hall-effect sensor 650 is positioned within a cutout in the circuit board 660, and is connected to the circuit board by leads 670 that are soldered to a pair of circuit paths 675 that define the bus which electrically connects the Hall-effect sensor 650 to the console 505.

Hall-effect sensors 680 and 685, which correspond, respectively, to switches 100*a* and 100*b*, are positioned in cutouts in the side of circuit board 660. Sensors 680, 685 are angled relative to the circuit board 660, and are connected by leads 670 that are soldered to the circuit paths 675. An additional pair of Hall-effect sensors of switches 100*d* and 100*e* which, as noted above, respond to magnets in the surgical cutting instruments to identify the type of instrument installed in the handpiece 400, are angled and connected in the same way. Finally, the circuit board 660 includes an extension 695 that aids in insertion of the circuit board 660 into the channel 665.

Referring now to FIGS. 2A and 2B, in a preferred embodiment of the invention, the handpiece includes the plurality of manually operated control switches 100, which, in earlier embodiments, could be found on the front panel of system controller housing. These switches might control, in the illustrated embodiment, as noted above, forward (100*a*), and reverse (100*b*), or oscillate (100*c*), modes of rotation of the armature of the brushless motor. These switches, would ordinarily each require at least a separate pair of leads from each switch, out the back of the handpiece, thus forming the cable 410 to the controller housing. In accordance with the invention, however, the manually controlled switches 100, rather than a push button mechanical switch as used previously, is replaced by the Hall-effect switch assembly, which includes a Hall-effect and magnet combination, comparable to that used in detecting motor position as described in, for example, U.S. patent application Ser. No. 08/529,191, filed Sep. 15, 1995, the disclosure of which is incorporated herein, in its entirety, by reference. In accordance with this preferred embodiment of the invention, and referring to the mechanical cross-sectional drawing of the handpiece illustrated in FIGS. 10C, 10D, the Hall-effect switch devices 100*a*, 100*b*, 100*c*, which replace the mechanical push button switches heretofore used, operate, as noted above, so that as a magnet within the movable, spring loaded, push button is advanced toward the Hall-effect sensor the state of the Hall-effect sensor will change. Thus, the proximity of the magnet to the Hall-effect sensor controls and effects the state of the device which can then be electrically determined by the controller.

Figure 9:
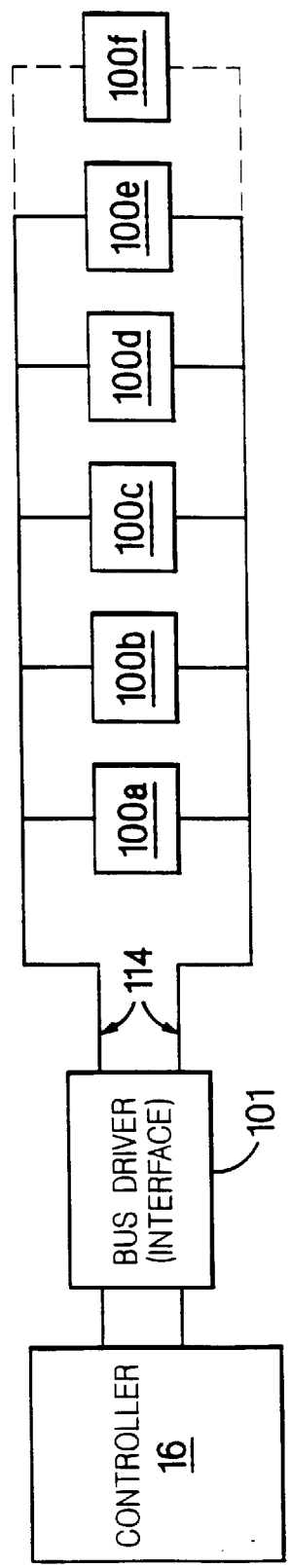
FIG. 9 is an electrical schematic of the Hall-effect switch assemblies connected to the switch bus.

Referring to FIG. 9, in a preferred embodiment of the invention, the handpiece Hall-effect sensors 100a, 100b, 100c, 100d, 100e are each connected to a two-wire switch bus 114. Each Hall-effect assembly can be electrically addressed. The preferred and illustrated units are manufactured by Allegro Microsystems, Inc., as part number A3054SU-XX, where "XX" represents the address, in digital numerals, of the sensor. Then, each Hall-effect sensor is capable of providing digital magnetic sensing signals in response to an initiating request over switch bus 114 from the controller. The particular Allegro units identified, in addition, enable the same bus to provide power to the sensors. (The Allegro units can also be mechanically switch operated in the same manner as if magnetically actuated by the presence of a magnetic field, if desired.)

In operation then, the controller 16 can poll, or send an inquiry to, each of the Hall-effect sensor "IC's", in a known sequence, through bus driver (interface) 101, and can determine the status of the switches to control, as described hereinbefore, the movement of the motor.

In particular, in the preferred illustrated embodiment of the invention, five Hall-effect sensor IC's 100a, 100b, 100c, 100d, 100e are employed. (In other embodiments, more or fewer sensor IC's can be employed.) Three of the sensor IC's, 100a, 100b, and 100c as described with regard to FIGS. 10C, 10D are provided for enabling push button control of the motor at the handpiece. The two other Hall-effect sensor IC's 100d and 100e are provided to detect the family to which the surgical instrument being used belongs. As will be described hereinafter, a sixth Hall-effect sensor IC 100f, also connected to the same switch bus 114 and thus to the controller, is positioned in the foot switch and determines, in the illustrated embodiment, whether an aperture locked mode for the system has been initiated.

The controller responds to activation of the various push buttons to control the motor in the same manner as was previously employed when the push buttons appeared on the control panel or elsewhere. In addition, as noted above, the controller also recognizes up to four classes (in the illustrated embodiment) of surgical instrument (corresponding to the four different states of Hall-effect sensors 100d, 100e). In response to the particular class or family of surgical instruments being employed, the controller sets parameters such as, in particular, the maximum speed for the class of surgical instrument being used. The controller can also, therefore, automatically adjust to both different handpieces and different classes of surgical instrument without the need to reprogram or recalibrate the system. This advantageous method of provides significant and particular safety features unparalleled in earlier systems.

Figure 11:
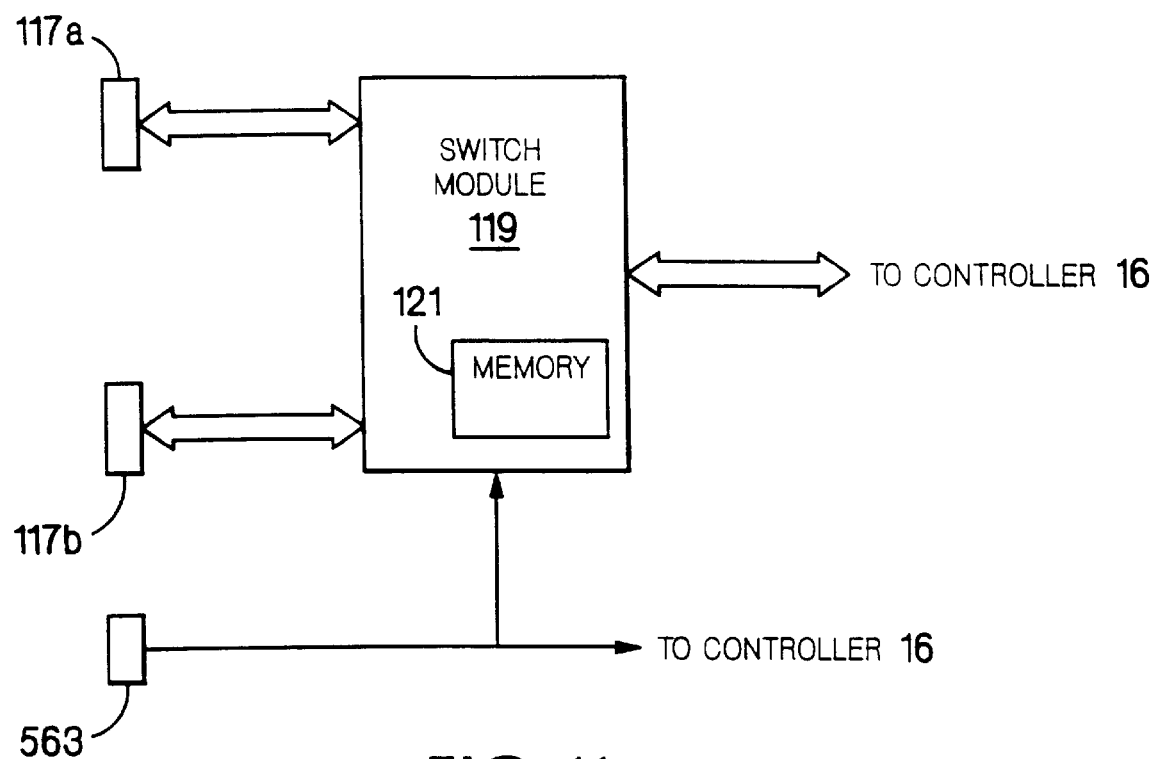
FIG. 11 is a block diagram illustrating the two input device functionality of the invention.

Referring now to FIG. 11, the control system of the present invention provides two separate and distinct connections 117a and 117b (connectors 561 and 562 of FIG. 10B) for connecting a surgical assembly, electrically, to the controller. The connection is manually switchable, at the front panel of the controller housing, from one connector to the other by switch 563. Electrically, the connectors 117 are switched by a collection of electronic switching elements contained in a switch module 119, each acting as a single pole, double throw switch. The output of switch 563 controls the state of switch module 119. The controller automatically resets the system when a new surgical assembly is connected, so that the power, as applied to the newly connected handpiece, will always and safely be applied in an off condition. In accordance with this preferred embodiment of the invention, the control signals are switched using analog and digital switching techniques which operate electronically in a fast, clean, single-pole, double-throw operation for either the analog or digital signal paths, depending upon the nature of the signal connection being switched. In the illustrated embodiment of the invention, there exist digital signal paths and analog signal paths corresponding to the various foot switch, motor control, and digital (Hall-effect device) signals being monitored from or supplied to the handpiece. The controller also employs a non-volatile memory system 121, contained within switch module 119, to "remember" the parameters associated with the previous surgical device. Those are the parameters which are loaded initially back into the system when the system switches back to the previous handpiece, to thus enable the surgeon to quickly effortlessly switch handpieces (and hence instruments) without need to reprogram the various speed, and other parameters for the new handpiece.

In yet another aspect of the invention, the pulse width modulation signal, as used in various prior art systems, has been found to have a non-linear relationship with and the drive current to the three-phase motor. Accordingly, therefore, the invention features drive level circuitry 24 for converting the pulse width modulation signal to a DC voltage level over a line 160, indicated as M+ VAR in FIG. 2B, which is then used to control the three-phase bridge and driver circuit 18. In this manner, the power applied to the DC motor evokes a substantially linear relationship to the actuating pulse width modulated signal.

Referring to FIGS. 2A and 2B, in the illustrated embodiment of the invention, the controller can also interface with a display system, television monitor 69. Using an RS232 port 170, the physician can have the controller display, in a large screen format, the speed and mode of operation of the surgical system so that it can be read more easily and quickly than it might be through the relatively smaller LED display on the controller housing panel.

Figure 11A:
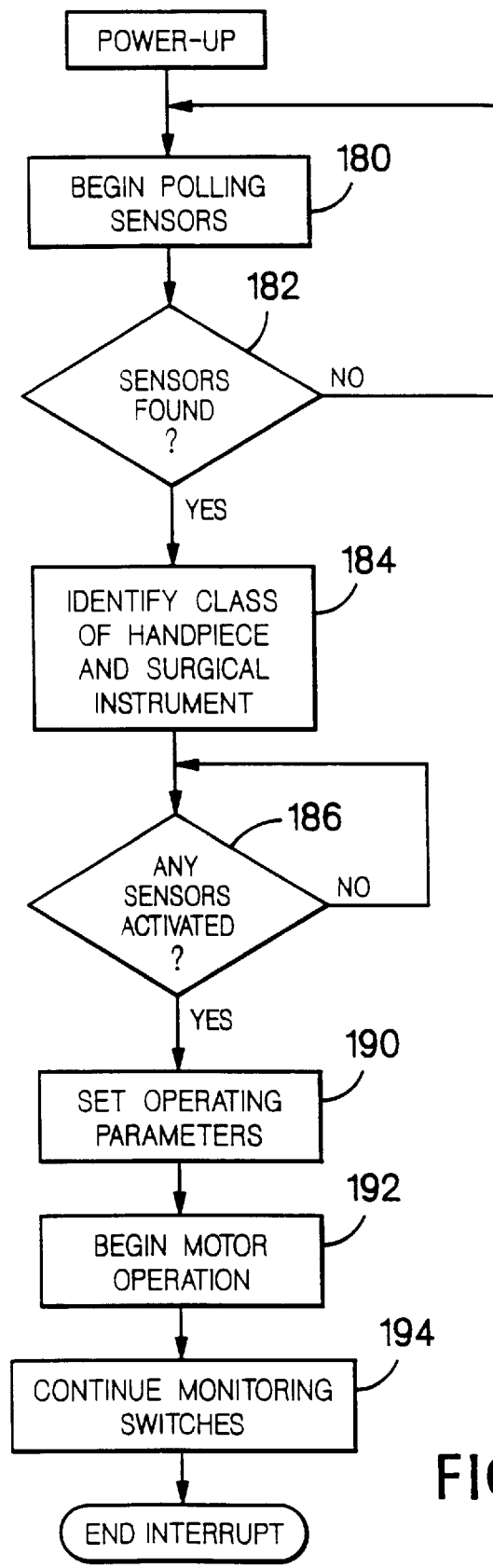
FIG. 11A is a flow chart illustrating controller operation regarding the addressable Hall-effect assemblies.

In yet another aspect of the operation of the illustrated embodiment of the invention, and referring to the flow chart of FIG. 11A, the controller, upon power-up, enters an initial reset state in which it begins polling, at 180, the addressable Hall-effect sensor IC's connected to the switch bus 114 to determine both their state, as well as their "existence". Upon recognizing their existence at 182, the controller then uses a table look up at 184 to identify the class of the handpiece as well as the type of surgical instrument being used, if any has been inserted into the handpiece. If none has been inserted, the system defaults a class "00" (corresponding to no magnets in juxtaposition to the Hall-effect sensors 100d, 100e) and uses the default parameters associated with that class.

The controller then continues in a loop 186 to identify and determine whether any of the push buttons, either the Hall-effect sensor associated push buttons or the manual buttons available at the front panel or on the foot switch have been depressed. This occurs, in accordance with the preferred embodiment of the invention, by polling each of the addressable switch elements along the switch bus and in addition checking the signal levels at each of the manual switches, to determine the existence of an activation signal, if any. In response to the various switches, the controller sets the appropriate parameters, at 190, once a switch activation has been detected and thereafter begins rotation of the motor at 192, if requested. Upon initiation of motor rotation, and in response to the various switches, the controller operates the DC motor, as has been described above, at the speed and in the mode called for by the various switches. The controller continues to monitor, at 194, the varying switch elements and upon actuation of further switch elements operates to vary the mode of operation, the speed of operation, and/or the direction of operation to match the required instructions provided through the switch elements.

Figure 12:
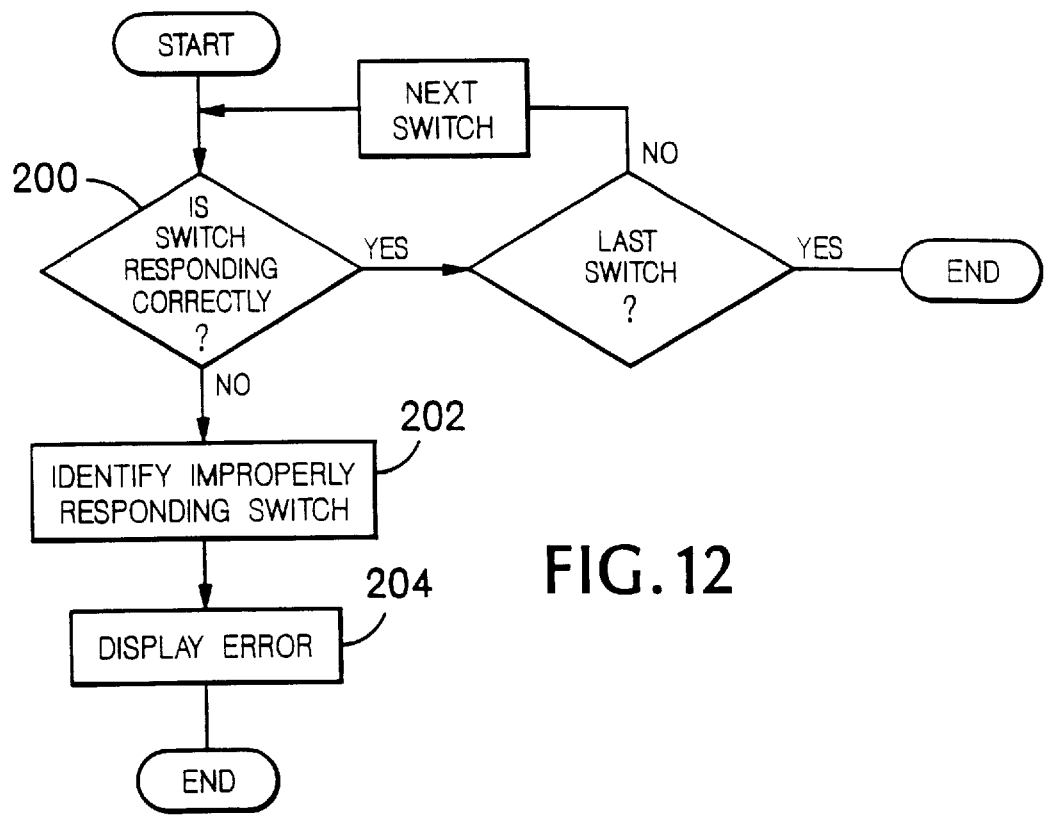
FIG. 12 is a flow chart illustrating operation in the event of a failure of an addressable Hall-effect assembly.

Referring to the flow chart of FIG. 12, in the event one of the addressable Hall-effect switch elements fails to operate correctly, that is, does not respond properly to the controller generated address signal, at 200, the controller has the additional capability of identifying that element at 202, and indicating, at 204, on a display panel, that the switch is in an error mode. This advantageously enables the user to plug in, instead, a different handpiece or and provides additional safety features and advantages in accordance with the invention.

Figure 13:
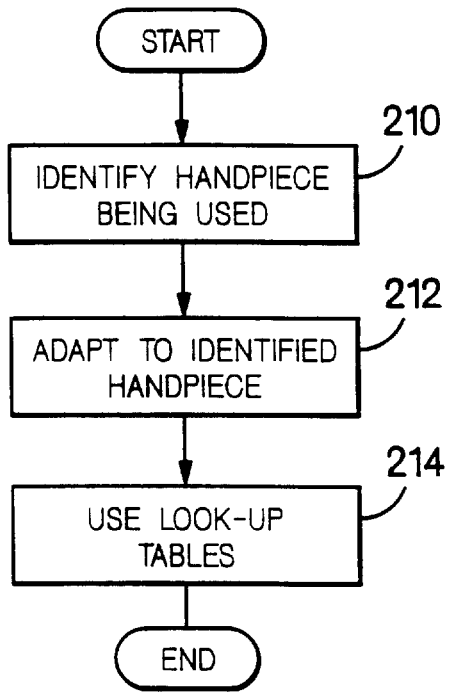
FIG. 13 is a flow chart illustrating operation of the controller for identifying handpiece and instrument classes.

Referring now to FIG. 13, in accordance with the invention, the controller is able to identify the handpiece being used, (at 210), including the model and style of handpiece, from the addresses of the Hall-effect assemblies. The controller, then, can adapt itself, at 212, to varying handpieces having differing configurations of Hall-effect sensors, different in either number or function. In this manner, the system in accordance with the invention can be operated with a number of different handpiece units by merely using look up tables, at 214, for example, to identify, in response to the addresses of the Hall-effect sensors, that set of prerecorded parameters associated with that handpiece. This flexibility can be accomplished without further and unnecessary reprogramming of the controller. This flexible feature of the illustrated embodiment of the invention, available only because the Hall-effect switches can be uniquely identified by their addresses, provides yet additional advantages for the present embodiment of the invention.

As noted above, the microprocessor based controller, referring to FIG. 2B, outputs the pulse width modulated signal over line 19, the signal having a duty cycle corresponding to the level of drive which is determined correct by the controller 16. The two level pulse width modulated signal, over line 19, in earlier embodiments of the drive circuitry, such as that illustrated in the above-identified U.S. patent Ser. No. 08/135,297 was applied directly to the three phase bridge to gate the control output signals over lines 27. The pulse width modulation signal was thus used to vary the average current supplied to the motor 10. It has been determined, however, that the relationship between motor velocity and pulse width modulation duty cycle for that implementation was not linear. Accordingly, an alternative approach was needed to provide a linear, or nearly linear relationship between the pulse width modulation duty cycle and the motor rotational velocity.

Referring to FIG. 2B, the controller 16 generates the pulse width modulation signal over line 19. This signal is designated PWM0. The signal is directed to the drive level circuitry 24, which is a pulse width modulation power supply having a DC output level over line 160 which is provided to the three phase bridge and driver 18.

Figure 14A:
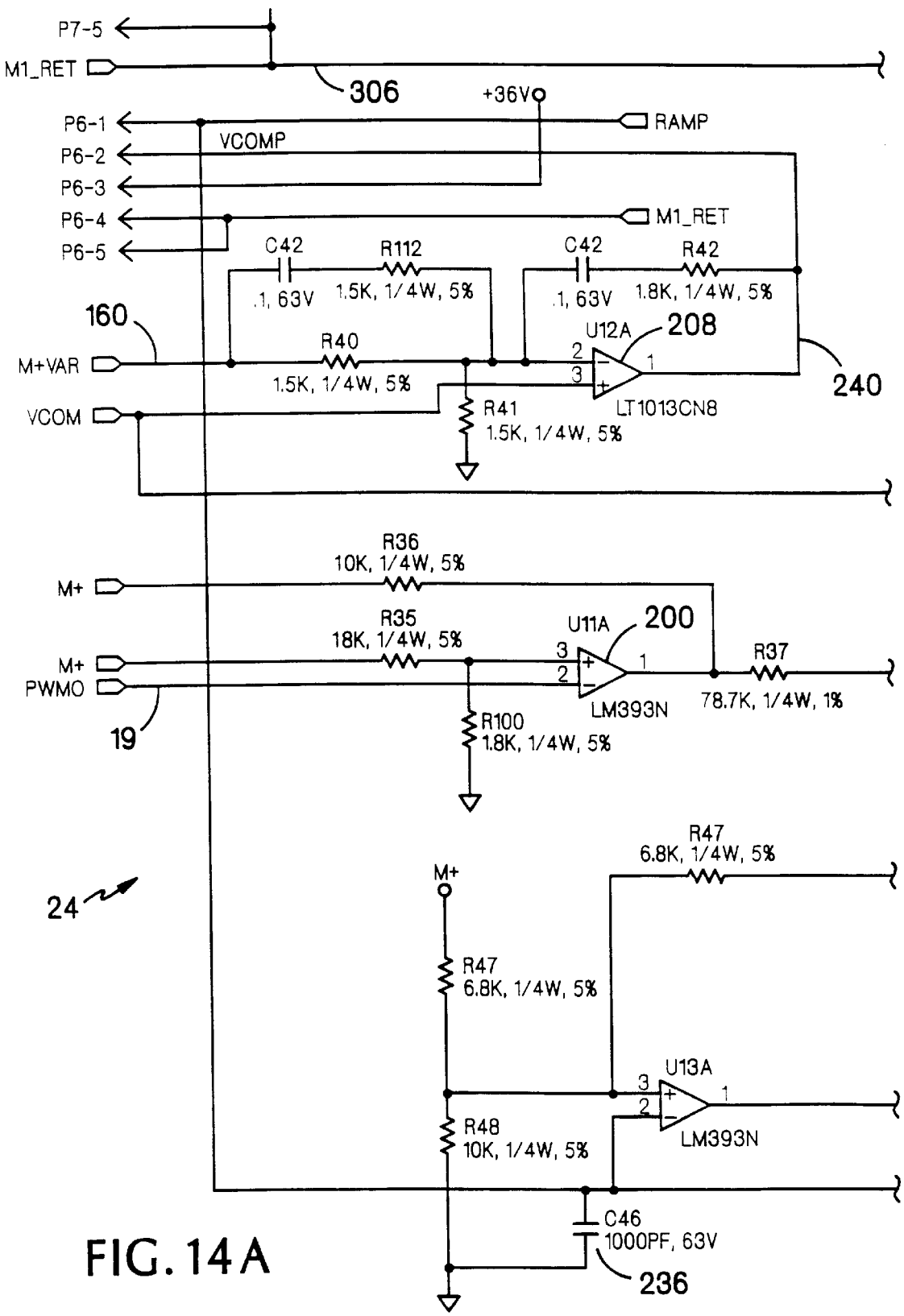
FIGS. 14A, 14B and 15 are schematic diagrams of different aspects of the drive level circuit.
Figure 14B:
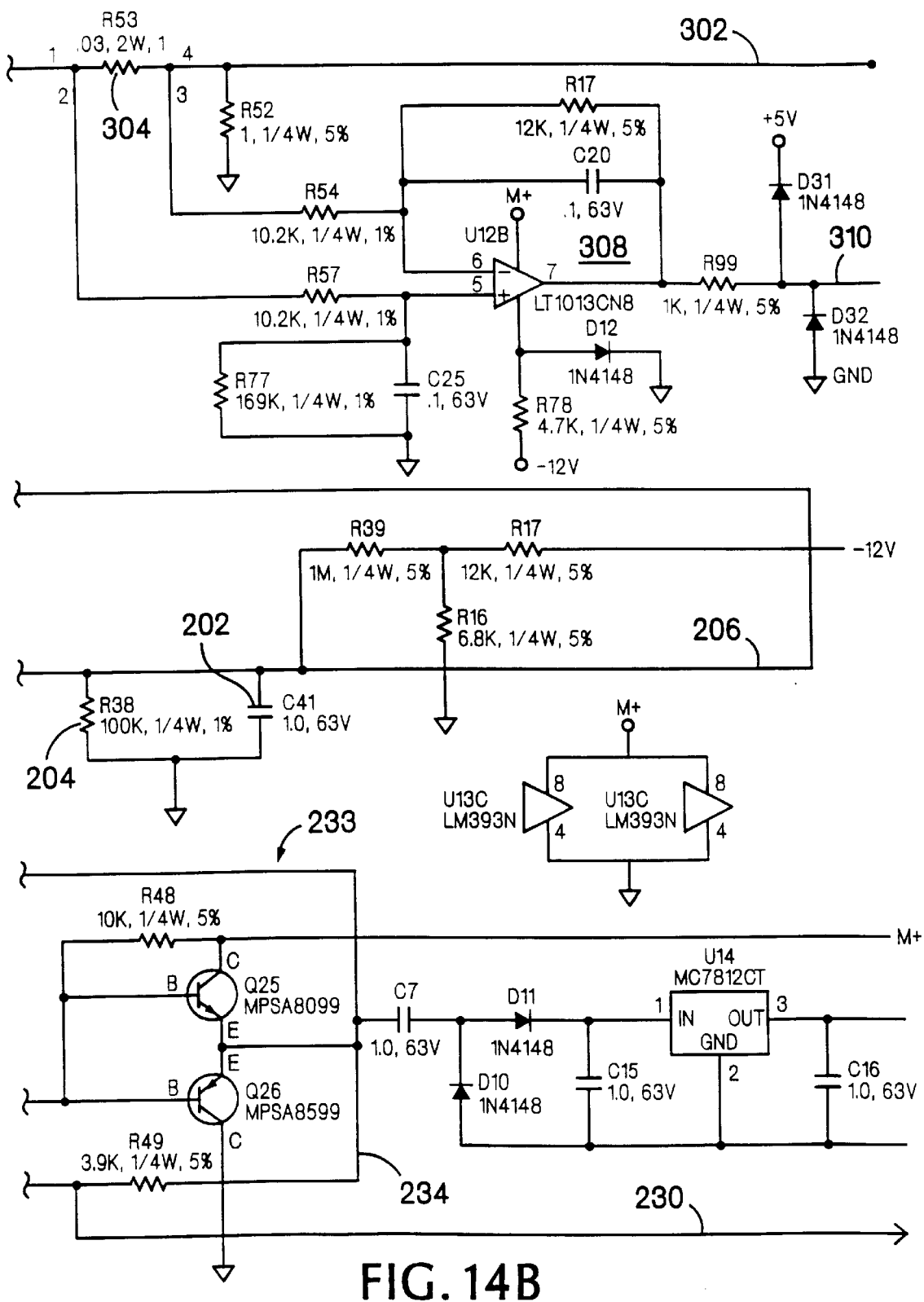

Referring to FIGS. 14A and 14B, the pulse width modulation signal over line 19 is squared up using a comparator 200. The output of the comparator is then integrated using a capacitor 202 in parallel with a resistor 204. The output of the integrator network over a line 206 varies between 0 and 5 volts (the logic levels) and is applied as one input to a comparator 208.

Figure 15:
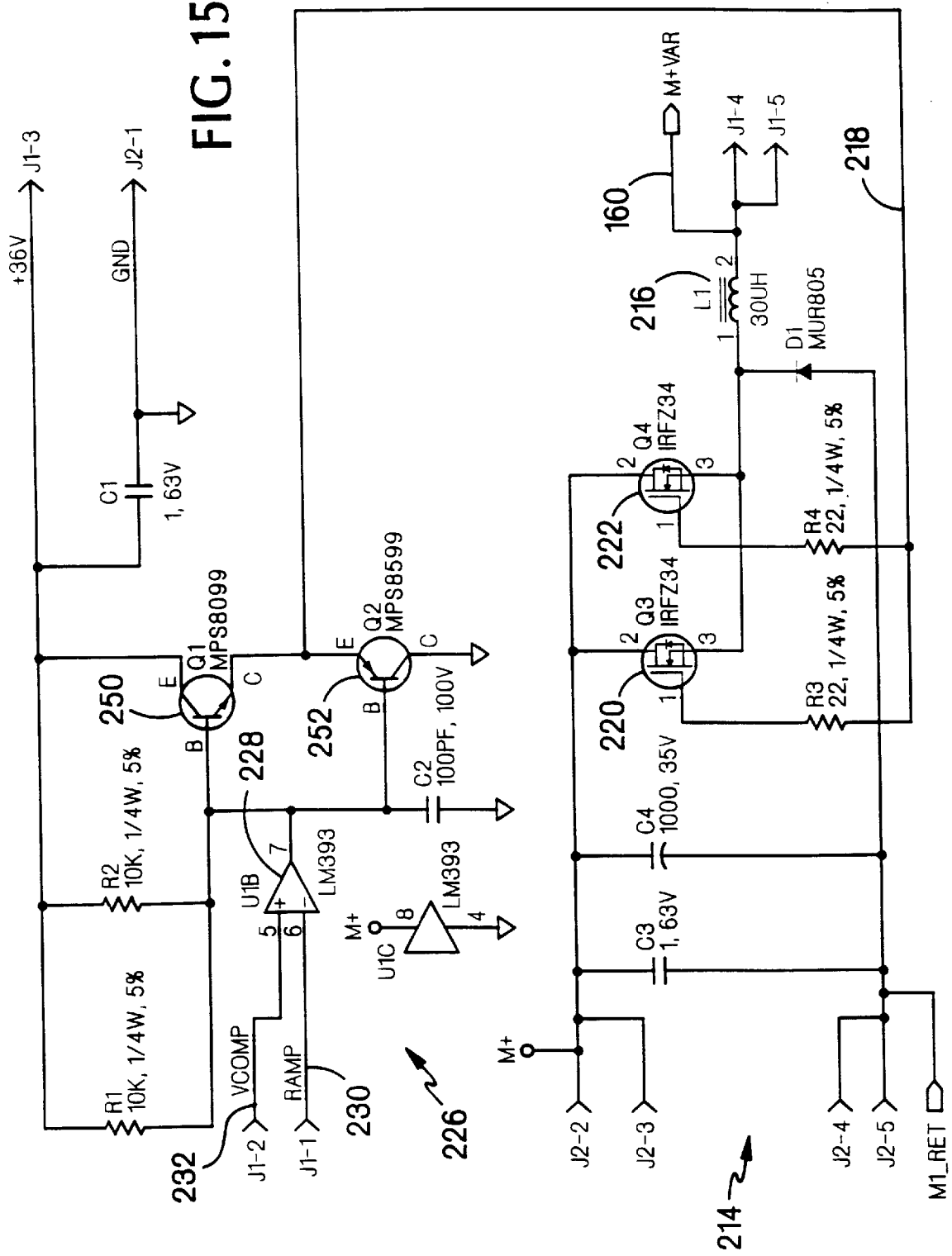

The other input of the comparator, is a variable DC level generated by the DC level circuitry 214 (FIG. 15). Circuitry 214 operates to drive a current through an inductor 216 when the gate drive level over a line 218 operates to turn on FET devices 220, 222. The gate drive signal over line 218 is generated by the gate drive circuit 226. In accordance with the circuit 226, a comparator 228 compares a triangular ramp signal over a line 230 with a voltage error output over a line 232. The ramp signal, a triangular wave form which has a voltage variation between that of the high logic voltage and ground, is generated using the output of a multi-vibrator circuit 232 (FIGS. 14A and 14B), the output of which over line 234 is applied to a capacitor integrator 236.

The voltage comparison output over line 232, referring to FIGS. 14A and 14B, is generated using the amplifier 208 which compares the desired output voltage over line 206 with the current actual output voltage to the motor over line 160. If the motor voltage needs to be raised, the output of amplifier 208 is positive, and if the output to the motor needs to be lowered, the output of amplifier 208, on a line 240, is negative. The operational amplifier 208 is connected in a filter mode so that abrupt changes in motor voltage will not occur.

Returning, now to circuit 226 (FIG. 15), when additional energy is requested by the controller to be delivered to the motor, the signal over line 232 decreases in value, thereby providing a greater "on time" (high voltage value) at the output of amplifier 228. As a result, transistors 250, 252 alternately turn on and off and provide an output over line 218 to turn on FETs 220 and 222, thereby driving current through inductor 216 to generate the output signal over line 160. When the voltage level on line 232 is greater than the value of the triangular signal over line 230, transistor 250 turns on thereby turning on FETs 220 and 222. When the value of the signal over line 232 is less than the value of the triangular signal over line 230, transistor 252 turns on while transistor 250 turns off. In this manner, the FET gate signal generates the variable voltage signal over line 160 which is applied with proper phasing to the motor by the three phase bridge and driver circuit 18.

Figure 16A:
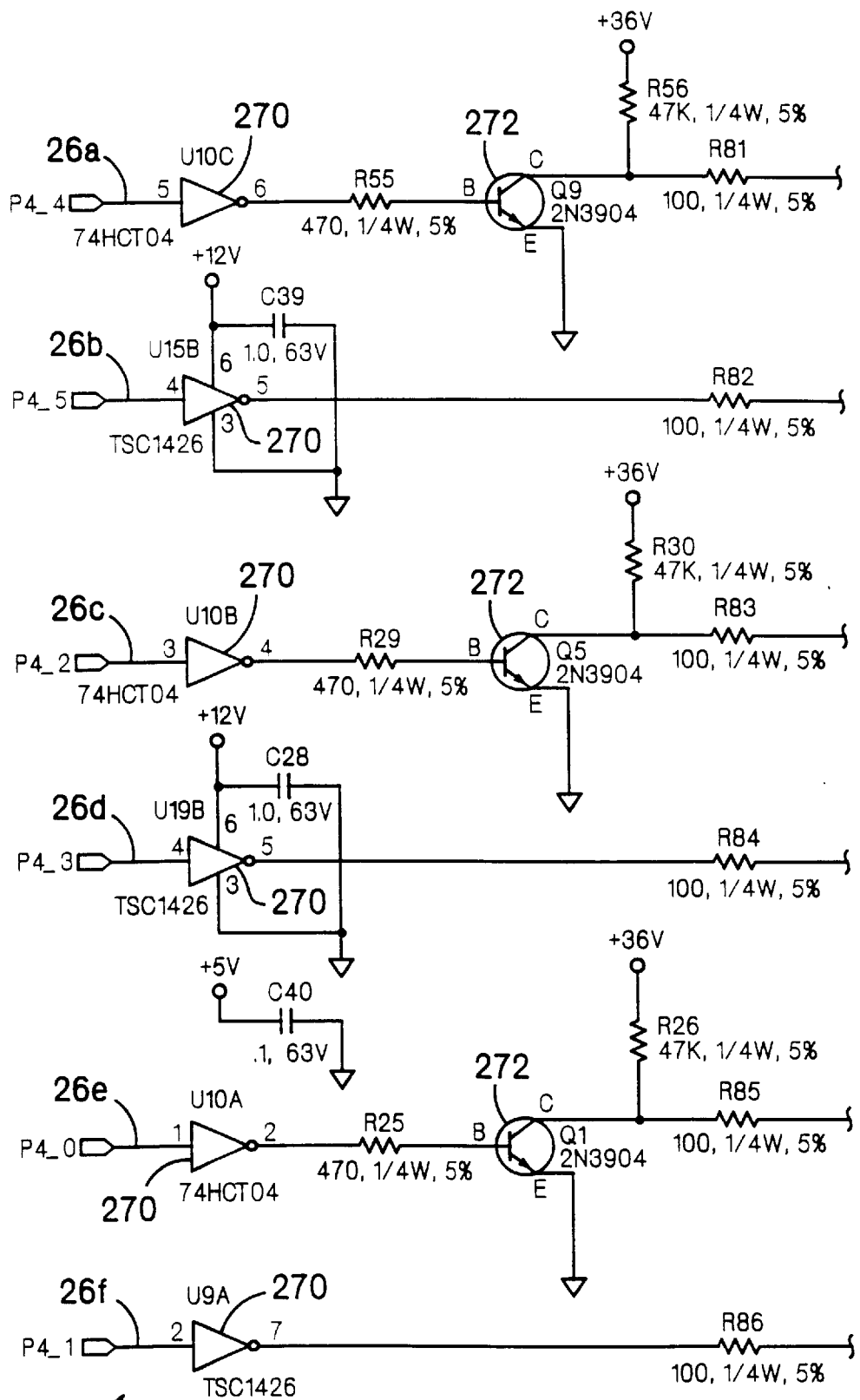
FIGS. 16A and 16B represent a schematic diagram of aspects of the three phase bridge and driver circuitry.
Figure 16B:
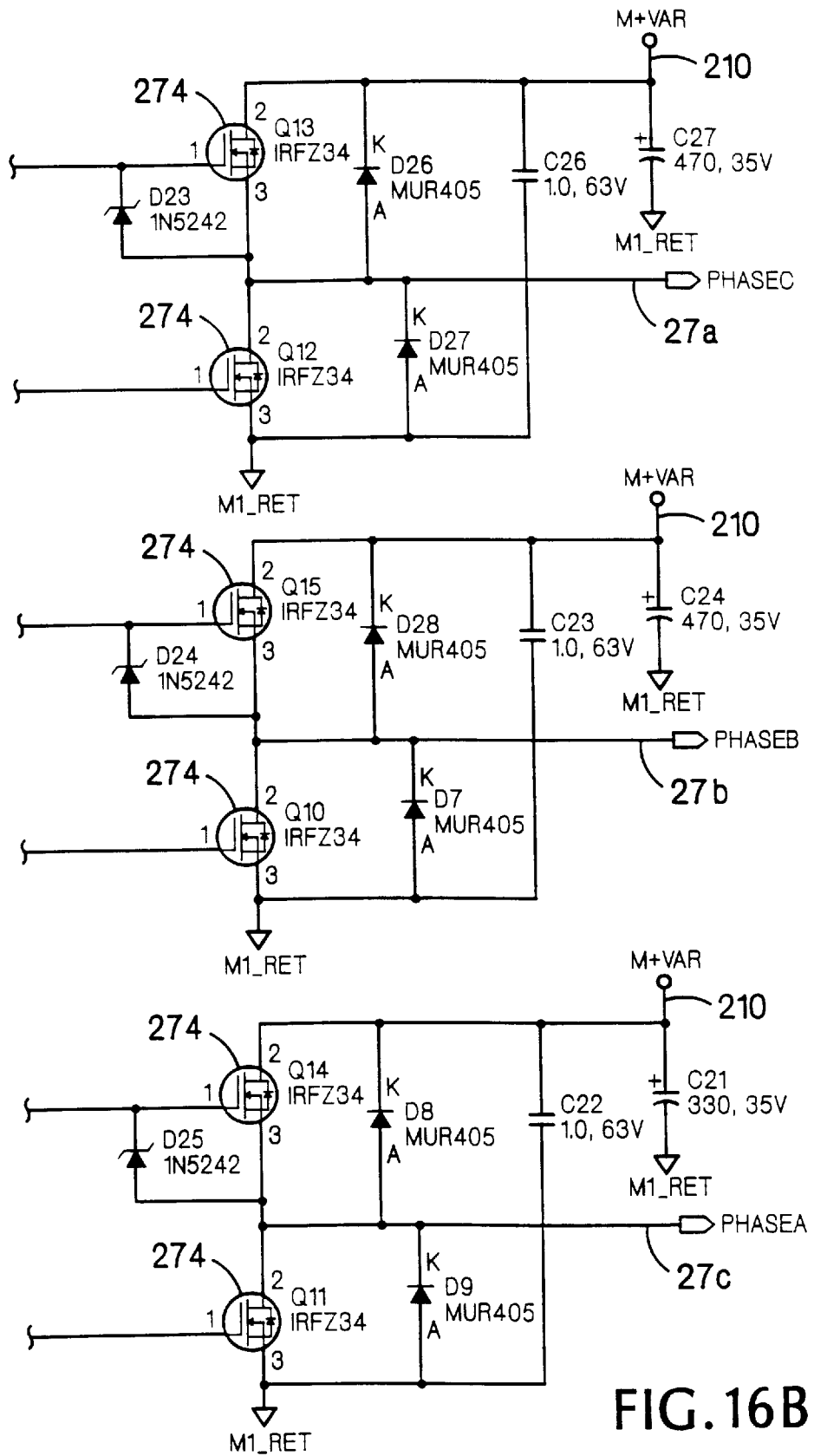

Referring to FIGS. 16A and 16B, the three phase driver and bridge 18 receive their commutation inputs over lines 26 (26a, 26b, 26c, 26d, 26e, and 26f) and provide the three phase motor drive output over lines 27 (27a, 27b, and 27c) to the motor 10. The driver for each commutation signal is provided by an amplifier 270 with one of the two commutation signals for each phase gates of a drive transistor 272. The driver section controls the gates of FET devices 274 which provide a voltage signal over lines 27 equal to the value of the generated voltage control signal over line 160 at the correct times and in the correct phase to continuously drive the three phase DC motor. Thus, as the value of the signal level on line 160 changes, in response to variations in the pulse width modulation signal duty cycle, the rotational velocity of the motor 10 varies in a linear relationship to it, and hence to the pulse width modulation signal generated by the controller 16.

Referring again to FIG. 14, the current being applied to the three phase motor 10 has a return, over a line 300 which passes through a precision resistor 304 to the system power return over a line 306. The voltage developed across resistor 304, representing the current applied to the motor 10, is differentially amplified by a differential amplifier circuit 308 and the output is made available over a line 310 (see also FIGS. 2A and 2B). This output is applied to one of the A-D converters (ADC7) of the controller and is read and monitored by the controller 16.

In summary, in accordance with the invention, the sealed handpiece illustrated in FIG. 10A has but limited space to provide the connecting cable 410 to the controller 16. The space becomes more limited as the size of the handpiece is reduced to accommodate the desires of medical personnel and/or as the number of functions placed in the handpiece increases to satisfy those same personnel. The combination of increased functionality in the handpiece with reduced size, and the need to seal the handpiece in its harsh medical/surgical operating environment, places a severe limitation on the number of physical wires which can be passed from the interior of the handpiece to the controller. Thus, the mere addition of three additional hand operated buttons on the handpiece would ordinarily require at least six additional wires to be provided. Instead, in accordance with the illustrated embodiment of the invention, a reduction of two wires can be achieved as follows.

Ordinarily, the handpiece, in accordance with earlier implementations had two Hall-effect sensors 100*d*, 100*e* for detecting the class of surgical instrument being inserted into the handpiece. This required four wires to be passed from the Hall-effect sensors (two for each sensor) back to the controller. In accordance with the illustrated embodiment of the invention, as described above, wherein the Hall-effect sensor IC's are each connected to the same two-wire switch bus 114, only two wires are required for the two existing Hall-effect sensors plus three (or more) additional, manually operated, Hall-effect sensors 100*a*, 100*b*, 100*c*. This advantageously impacts the size of the wire cable passing from handpiece to controller and indeed may even provide some additional "spare" wires to handle unforeseen future situations.

While the invention has been illustrated and described as embodied in an all-digital speed control system for a brushless three-phase DC motor, it is not intended to be limited to the details shown, since various modifications and structural changes may be made without departing in any way from the spirit of the present invention.

APPENDIX A
FOR
UNITED STATES LETTERS PATENT
TITLE:  MOTOR CONTROLLED SURGICAL SYSTEM
APPLICANT:  MICHAEL A. BRODSKY
KENNETH W. KRAUSE Appendix A

```
$PG PL=59 PW=112 TL(ESP)
; ESP system software
; KK931102
;   Version
;   ESPV10        Release for market preference test              KK951030 dog       equ       0FFh                    ; watchdog
pwm0      equ       0FCh
ipx1      equ       0F8h                    ; interrupt priority
ctcon     equ       0EBh                    ; capture control
iex1      equ       0E8h
tm2ir     equ       0C8h                    ; CT interrupt flags
adch      equ       0C6h                    ; adc high byte
adcn      equ       0C5h                    ; adc control
pY        equ       0C4h                    ; port 5 address
pX        equ       0C0h                    ; port 4 address seg       data                    ; RAM (links @ 8)
bank1     ds        8                       ; sio data area
bank2     ds        8                       ; velocity data area
bank3     ds        8                       ; display & general purpose registers
ctrl      ds        1                       ; software control bits
lo16      ds        1                       ; low byte for 16 bit PID scaling
hi16      ds        1                       ; high byte for 16 bit PID scaling
halls     ds        1                       ; indicates devices present
magnet    ds        1                       ; indicates magnets present
toggle    ds        1                       ; RFO hand control state toggle
button    ds        1                       ; hand control routine output
input     ds        1                       ; hand control routine input
leds      ds        1                       ; LED status mask
gain      ds        1                       ; PID gain value
stat      ds        1                       ; requested status
target    ds        1                       ; target velocity
rpm       ds        1                       ; velocity loop set speed
lag       ds        1                       ; oscillate mode initial cycle time
dir       ds        1                       ; direction control register
new       ds        1                       ; p1 present
old       ds        1                       ; p1 last
rotate    ds        1                       ; +1 or -1 for armature tracking
posit     ds        1                       ; output shaft position
amp       ds        2                       ; 10 bit motor current
tic       ds        1                       ; general purpose countdown timer
dtac      ds        1                       ; dynamic tachometer count
serial    ds        1                       ; serial command from sio rx routine
offset    ds        3                       ; footswitch offsets
mask      ds        1                       ; adc address mask for adcn
max       ds        1                       ; maximum pedal pressure
pedal     ds        1                       ; footswitch status
calctr    ds        1                       ; calibration time counter
mm        ds        1                       ; bargraph scale factor
bb        ds        1                       ; bargraph offset vector
xx        ds        1                       ; bargraph scale multiplier
nul       ds        1                       ; dummy variable
hmask     ds        1                       ; 8 bit mask for halls and magnet
Iq        ds        1                       ; quiescent current
set       ds        1                       ; set speed
index     ds        1                       ; 0 - 9 oscillate mode index
mode      ds        1                       ; preferred operating mode
mpb       ds        17                      ; motor parameter block
dsr       ds        1                       ; byte 1 of the following idata block
```

```
                seg     idata                   ; INDIRECT RAM
                ds      48                      ; nonvolatile device recall block
screen          ds      41                      ; vf display buffer
stack           equ     $-1                     ; put stack at end seg     code                    ; PROGRAM
                ajmp    init
                org     3                       ; external interrupt 0
                ljmp    display
                org     0Bh                     ; timer 0 vector
                mov     tl0,mpb+1               ; timer value with overhead
                mov     th0,mpb+2
                ajmp    velocity
                org     13h                     ; external interrupt 1
                mov     a,#0FFh
                mov     p0,a                    ; reset ports
                mov     p1,a
                mov     p2,a
                mov     p3,a
                mov     pX,a
                orl     pcon,#2                 ; power down mode
                org     23h                     ; SIO
                ljmp    sio
                org     33h                     ; CT vectors
                ljmp    commutate
                org     3Bh
                ljmp    commutate
                org     43h
                ljmp    commutate
init
                mov     sp,#stack
                mov     r0,#5                   ; wait for display to warm up
in1             push    acc
                djnz    acc,$
                pop     acc
                djnz    acc,in1
                acall   watchdog
                djnz    r0,in1
in0             mov     @r0,a                   ; zero volatile RAM
                inc     r0
                cjne    r0,#set,in0
                mov     p0,a                    ; clear hall bus and LEDs
                mov     bank3,#screen           ; initialize r0 bank 3
                mov     bank1,#bank1+2          ; r0 = r2 bank 1
                mov     bank1+7,#81h            ; r7 = tx sync bank 1
                mov     dir,#1Eh                ; forward direction
                mov     rotate,#1
                mov     nul,#1                  ; variable for bargraph scaling
                mov     hmask,#1                ; hall bus address control
                mov     tmod,#21h               ; timer 0 mode 1 - timer 1 mode 2
                mov     tl1,#230
                mov     th1,#230                ; 1201.923 baud
                mov     scon,#70h               ; serial mode 1 w/sm2 set
                mov     ctcon,#3Fh              ; rising or falling edge on hall input
                mov     ipx1,#7h                ; set CT priority high
                setb    pX1                     ; set external interrupt 1 priority
                mov     iex1,#7h                ; enable CT interrupts
                mov     tcon,#55h               ; turn timers on, edge trigger ext int
                mov     ie,#97h                 ; enable SIO, tmr0 & ext interrupts
```

3.

```
            setb    tm2ir.0                     ; trigger commutate to find armature
            mov     dptr,#upc                   ; load user programmable characters
            mov     r0,#screen
.oop0       clr     a
            movc    a,@a+dptr
            mov     @r0,a
            inc     dptr
            inc     r0
            cjne    r0,#screen+36,loop0
            setb    ie0                         ; ok to start interrupt
loop5       mov     @r0,#20h                    ; fill with spaces
            inc     r0
            cjne    r0,#screen+41,loop5
loop6       mov     a,bank3
            cjne    a,#screen,loop6             ; wait for interrupt done
            mov     r0,#screen
            mov     @r0,#16h                    ; home
loop1       inc     r0
            mov     @r0,#20h                    ; fill with spaces
            cjne    r0,#screen+40,loop1
config
            mov     sp,#stack
            mov     pedal,#0                    ; reset footswitch
            mov     calctr,#255                 ; force calibration on start up
            mov     button,#0                   ; reset hand control bytes
            mov     toggle,#0Eh
            mov     input,#0Eh
            mov     mpb,a                       ; save new device number
            mov     b,#6
conf0       acall   device
            djnz    b,conf0
            rl      a
            mov     dptr,#con_table
            jmp     @a+dptr
watchdog
            orl     pcon,#10h                   ; feed the dog
            mov     dog,#0
            ret
device                                          ; check device status
            acall   watchdog
            acall   UGN3055                     ; read hall devices and states
            mov     a,pX                        ; check for footswitch
            cpl     a
            anl     a,#0C0h
            jnz     dev6
            setb    leds.3                      ; footswitch is missing
            mov     calctr,#255
            mov     pedal,a                     ; reset footswitch control
            sjmp    dev4
dev6        clr     leds.3                      ; footswich is present
            setb    p0.3
dev4        mov     a,p1                        ; check motor id
            cpl     a
            anl     a,#0F0h
            jnz     dev5
            setb    leds.1                      ; motor is missing
            sjmp    dev1
dev5        clr     leds.1                      ; motor is present
            setb    p0.1
            swap    a
```

4

```
              cjne    a,#1,dev1           ; jumper 1 defines shaver motors
              mov     a,halls
              cjne    a,#0FFh,dev2        ; turn on fault light
              setb    p0.4                ; bus fault defines slowest motor
              mov     a,#4
              sjmp    dev1                ; clear fault
dev2          clr     p0.4
              jnz     dev3                ; defines basic motor
              inc     a
              sjmp    dev1                ; check for hand controls
dev3          cjne    a,#1Fh,dev7
              jnb     leds.3,dev7         ; no footswitch required
              clr     leds.3
              clr     p0.3
dev7          mov     a,magnet
              anl     a,#3
              add     a,#3                ; defines blade type
dev1          cjne    a,mpb,config
              ret
con_table
              ajmp    con0                ; no motor
              ajmp    con1                ; size 9 basic motor
              ajmp    con2                ; size 5 mini motor
              ajmp    con3                ; size 9 straight blades
              ajmp    con4                ; size 9 curved blades
              ajmp    con5                ; size 9 high speed abraders
              ajmp    con0                ; reserved for 2 magnet blades
              ajmp    con0
              ajmp    con0
              ajmp    con0
              ajmp    con0
              ajmp    con0
              ajmp    con0
              ajmp    con0
              ajmp    con0
                                          ; UDFR
st_table
              ajmp    state0              ; 0000 display set
              ajmp    state1              ; 0001 run reverse & display rpm
              ajmp    state2              ; 0010 run forward & display rpm
              ajmp    state3              ; 0011 oscillate & display rate
              ajmp    state4              ; 0100 decrement and display set
              ajmp    state4              ; 0101
              ajmp    state4              ; 0110
              ajmp    state7              ; 0111 decrement oscillate rate
              ajmp    state8              ; 1000 increment and display set
              ajmp    state8              ; 1001
              ajmp    state8              ; 1010
              ajmp    stateB              ; 1011 increment oscillate rate
              ajmp    stateC              ; 1100 jog & lock on armature position
              ajmp    stateC              ; 1101
              ajmp    stateC              ; 1110
              ajmp    stateC              ; 1111
con0                                      ; no motor
              acall   tx                  ; initiate transmit
              setb    leds.1              ; motor missing
              mov     r0,#screen+1        ; no min speed
              mov     @r0,#7Fh
              inc     r0
              mov     @r0,#7Fh
```

```
            inc     r0
            mov     @r0,#7Fh
            inc     r0
            mov     @r0,#7Fh
            mov     r0,#screen+17       ; no max speed
            mov     @r0,#7Fh
            inc     r0
            mov     @r0,#7Fh
            inc     r0
            mov     @r0,#7Fh
            inc     r0
            mov     @r0,#7Fh
            mov     dptr,#msg0          ; "675K"
            acall   message
            mov     r0,#screen+39
            mov     @r0,#0F9h
            inc     r0
            mov     @r0,#0FAh
            mov     r0,#screen+21       ; ><
            mov     @r0,#0F9h
            inc     r0
            mov     @r0,#0FAh
            acall   tx                  ; initiate transmit
c01         mov     tic,#12
c02         acall   device              ; wait for change
            acall   bar
            mov     a,tic
            jnz     c02
            mov     a,leds
            xrl     p0,a
            sjmp    c01
con1                                    ; size 9 basic motor
            mov     r0,#screen+1        ; 100 rpm min speed
            mov     @r0,#7Fh
            inc     r0
            mov     @r0,#0E1h
            inc     r0
            mov     @r0,#0E0h
            inc     r0
            mov     @r0,#0E0h
            mov     r0,#screen+17       ; 5000 rpm max speed
            mov     @r0,#0E5h
            inc     r0
            mov     @r0,#0E0h
            inc     r0
            mov     @r0,#0E0h
            inc     r0
            mov     @r0,#0E0h
            mov     mm,#205             ; bargraph scale variables
            mov     bb,#nul
            mov     xx,#1
            mov     dptr,#data1
            ajmp    load
con2                                    ; size 5
            mov     r0,#screen+1        ; 100 rpm min speed
            mov     @r0,#7Fh
            inc     r0
            mov     @r0,#0E1h
            inc     r0
            mov     @r0,#0E0h
```

```
        inc     r0
        mov     @r0,#0E0h
        mov     r0,#screen+17       ; 3500 rpm max speed
        mov     @r0,#0E3h
        inc     r0
        mov     @r0,#0E5h
        inc     r0
        mov     @r0,#0E0h
        inc     r0
        mov     @r0,#0E0h
        mov     mm,#37              ; bargraph scale variables
        mov     bb,#bank2+1
        mov     xx,#1
        mov     dptr,#data2
        ajmp    load
con3                                ; size 9 Spartan blades
        mov     r0,#screen+1        ; 200 rpm min speed
        mov     @r0,#7Fh
        inc     r0
        mov     @r0,#0E2h
        inc     r0
        mov     @r0,#0E0h
        inc     r0
        mov     @r0,#0E0h
        mov     r0,#screen+17       ; 5000 rpm max speed
        mov     @r0,#0E5h
        inc     r0
        mov     @r0,#0E0h
        inc     r0
        mov     @r0,#0E0h
        inc     r0
        mov     @r0,#0E0h
        mov     mm,#154             ; bargraph scale variables
        mov     bb,#bank2+1
        mov     xx,#1
        mov     dptr,#data4
        ajmp    load
con4                                ; size 9 curved blades
        mov     r0,#screen+1        ; 200 rpm min speed
        mov     @r0,#7Fh
        inc     r0
        mov     @r0,#0E2h
        inc     r0
        mov     @r0,#0E0h
        inc     r0
        mov     @r0,#0E0h
        mov     r0,#screen+17       ; 3000 rpm max speed
        mov     @r0,#0E3h
        inc     r0
        mov     @r0,#0E0h
        inc     r0
        mov     @r0,#0E0h
        inc     r0
        mov     @r0,#0E0h
        mov     mm,#86              ; bargraph scale variables
        mov     bb,#bank2+1
        mov     xx,#2
        mov     dptr,#data5
        ajmp    load
con5                                ; size 9 high speed abraders
```

```
        mov     r0,#screen+1        ; 200 rpm min speed
        mov     @r0,#7Fh
        inc     r0
        mov     @r0,#0E2h
        inc     r0
        mov     @r0,#0E0h
        inc     r0
        mov     @r0,#0E0h
        mov     r0,#screen+17       ; 8000 rpm max speed
        mov     @r0,#0E8h
        inc     r0
        mov     @r0,#0E0h
        inc     r0
        mov     @r0,#0E0h
        inc     r0
        mov     @r0,#0E0h
        mov     mm,#255             ; bargraph scale variables
        mov     bb,#nul
        mov     xx,#1
        mov     dptr,#data3
        ajmp    load
load
        mov     r0,#mpb+1           ; load motor parameter block
load0   clr     a
        movc    a,@a+dptr           ; get data from ROM
        mov     @r0,a               ; and put in RAM
        inc     dptr
        inc     r0
        cjne    r0,#mpb+13,load0
        mov     tl0,mpb+1           ; timer with overhead
        mov     th0,mpb+2
        mov     a,mpb+11            ; 1 second
        clr     c
        rrc     a
        mov     mpb+13,a            ; .48 second
        clr     c
        rrc     a
        mov     mpb+16,a            ; .24 second
        mov     b,#6
        div     ab
        mov     mpb+15,a            ; .04 second
        mov     b,#10
        mul     ab
        mov     mpb+14,a            ; .40 second
        acall   user                ; get user preferences
state
        mov     sp,#stack           ; reset stack
        mov     stat,a              ; save new
        mov     b,#5                ; 5 consecutive reads
stat0   push    b
        acall   status
        pop     b
        djnz    b,stat0
        mov     a,stat
        anl     a,#6
        jz      stat1               ; motor is off
        mov     mode,a              ; save operational mode
        anl     ctrl,#0EBh          ; clear blade lock and request
        sjmp    stat2
stat1   setb    ctrl.4              ; request blade lock
```

```
stat2     mov    a,stat
          jz     stat3
          orl    a,mode                  ; retain operational mode
stat3     mov    dptr,#st_table          ; goto new state
          jmp    @a+dptr
digital
          mov    a,p3                    ; read speed buttons
          cpl    a
          anl    a,#30h
          rr     a
          orl    a,pedal                 ; combine with pedal status
          orl    a,button                ; combine with hand control status
          cjne   a,stat,state            ; go to new state if different
current   mov    adcn,#7                 ; read motor current
          orl    adcn,#8
          mov    a,adcn
          jnb    acc.4,$-2
          anl    adcn,#0EFh
          rlc    a                       ; right justify 10 bit value
          mov    r3,a
          mov    a,adch
          rlc    a
          mov    r2,a
          mov    a,r3
          rlc    a
          mov    r3,a
          mov    a,r2
          rlc    a
          mov    r2,a
          mov    a,r3
          rlc    a
          anl    a,#3
          clr    et0                     ; hold interrupt during register load
          mov    amp+1,a
          mov    amp,r2
          setb   et0
          ret
handctrl                                 ; RFO hand control processor
          mov    a,magnet
          anl    a,#1Ch                  ; get and format from hall bus
          rr     a
          xch    a,input
          xrl    a,input                 ; zero if nothing changed
          jz     digital
          anl    a,input                 ; zero if button released
          jz     digital
          anl    a,toggle                ; toggle
          xrl    toggle,#0Eh
          jnb    acc.3,nosc              ; check oscillate button
          mov    a,#6                    ; set oscillate mode
nosc      mov    button,a
          jz     zero                    ; turn off motor
          mov    a,#0FFh                 ; turn on full speed
          mov    calctr,a                ; force footswitch calibration
zero      mov    target,a
          ajmp   digital
status
          acall  device
          mov    a,button
          jnz    handctrl                ; pass control to hand controls
```

```
        mov     a,pedal                 ; indicates if footswitch is on
        jz      off                     ; footswitch was off
        mov     a,#offset
        add     a,mask
        mov     r0,a                    ; pointer to active offset
        acall   adc
        subb    a,@r0                   ; subtract offset
        jnc     on                      ; pedal is still on
        mov     input,#0Eh              ; disable active hand control buttons
        mov     calctr,#255             ; force calibration
off
        inc     calctr
        mov     a,calctr
        jnz     off0
        acall   calibrate               ; calibrate every 3/4 seconds
off0    mov     r0,#offset
        mov     mask,#0
off1    acall   adc
        clr     c
        subb    a,@r0                   ; subtract offset
        jz      off4
        jnc     on                      ; pedal turned on if >0
off4    inc     r0
        inc     mask
        cjne    r0,#offset+3,off1       ; loop until done
off3    clr     a                       ; all three pedals are off so reset
        mov     pedal,a
        mov     mask,a
        mov     max,a
        mov     target,a
        ajmp    handctrl
on
        jb      halls.6,gas             ; gas pedal
        mov     a,pY
        cpl     a
        anl     a,#3
        rl      a
        mov     pedal,a                 ; format Bernstein data
        mov     target,#255
        ajmp    digital
gas
        mov     r2,a                    ; save adc value
        cjne    a,max,$+3               ; compare with max
        jc      on1
        mov     max,a                   ; save if new or same max
on1     mov     a,#255                  ; autosensitivity
        mov     b,max
        div     ab                      ; a = int(255 / max)
        mov     r3,a                    ; b = 255 mod max
        inc     a
        mul     ab
        mov     b,r2
        mul     ab                      ; b = [r2 * (int+1) * mod] / 256
        mov     a,r3
        mov     r3,b
        mov     b,r2
        mul     ab                      ; a = r2 * int
        add     a,r3            ; a = [r2 * int] + [r2 * (int+1) * mod] / 256
        jc      on2
        mov     r2,a
```

```
            mov     b,#51
            mul     ab
            mov     a,r2                    ; add 20% hysteresis
            add     a,b
            jnc     on3
on2         mov     a,#255
on3         mov     target,a
            mov     a,mask
            inc     a                       ; indicates pedal status
            rl      a
            mov     pedal,a
            ajmp    digital ; subroutine reads 8 bits from adc channel mask adc         mov     adcn,mask               ; prepare to read adc channel
            orl     adcn,#8
            mov     a,adcn
            jnb     acc.4,$-2
            anl     adcn,#0EFh              ; reset interrupt flag
            mov     a,adch                  ; read high byte
            cpl     a
            ret ; subroutine calculates new offsets calibrate
            mov     r0,#offset
            mov     mask,#0                 ; channel 0
cal         acall   adc                     ; start adc
            add     a,#10                   ; .196 volt guard band
            jnc     call
            mov     a,#255                  ; clamp at maximum
call        mov     @r0,a                   ; new offset for channel
            inc     mask                    ; next channel
            inc     r0
            cjne    r0,#offset+3,cal
            ret
run
            acall   rpmdsp                  ; display set speed
            acall   tx                      ; initiate transmit
run0        acall   status
            acall   bar
            sjmp    run0
state0                                      ; DISPLAY SET OR INDEX
            mov     a,mode
            cjne    a,#6,st01               ; check for oscillate mode
            acall   oscdsp                  ; display oscillate message
            sjmp    st02
st01        acall   rpmdsp                  ; display set speed
st02        mov     r0,#screen+39
            mov     @r0,#0F9h
            inc     r0
            mov     @r0,#0FAh
            mov     r0,#screen+21           ; ><
            mov     @r0,#0F9h
            inc     r0
            mov     @r0,#0FAh
            acall   tx                      ; initiate transmit
st03        mov     tic,#12
```

10

```
st00       acall    status              ; wait for change
           acall    bar
           mov      a,tic
           jnz      st00
           mov      a,leds
           xrl      p0,a
           sjmp     st03
state1                                   ; RUN REVERSE
           mov      dir,#26h
           mov      r0,#screen+39
           mov      @r0,#0FAh
           inc      r0
           mov      @r0,#0FAh
           mov      r0,#screen+21       ; <<
           mov      @r0,#0FAh
           inc      r0
           mov      @r0,#0FAh
           ajmp     run
state2                                   ; RUN FORWARD
           mov      dir,#1Eh
           mov      r0,#screen+39
           mov      @r0,#0F9h
           inc      r0
           mov      @r0,#0F9h
           mov      r0,#screen+21       ; >>
           mov      @r0,#0F9h
           inc      r0
           mov      @r0,#0F9h
           ajmp     run
state3                                   ; OSCILLATE & DISPLAY INDEX
           mov      r0,#screen+39
           mov      @r0,#0FAh
           inc      r0
           mov      @r0,#0F9h
           mov      r0,#screen+21       ; <>
           mov      @r0,#0FAh
           inc      r0
           mov      @r0,#0F9h
           acall    oscdsp              ; display index
           acall    tx                  ; initiate transmit
st31       mov      tic,lag
st30       acall    status
           acall    bar
           mov      a,tic
           jnz      st30
           setb     ctrl.0              ; tell velocity to change direction
           sjmp     st31
state4                                   ; SLOW DOWN
           mov      tic,mpb+11          ; 1 second
st40       mov      a,set
           clr      c
           subb     a,mpb+4             ; clamp at min
           cjne     a,mpb+5,$+3
           jc       st42
           mov      set,a               ; save new
st42       mov      a,set
           acall    rpmdsp              ; display set
           acall    tx                  ; initiate transmit
st41       acall    status
           acall    bar
```

```
                mov     a,tic
                jnz     st41
                mov     tic,mpb+15              ; 40 msec slew
                sjmp    st40
state7                                          ; DECREASE RATE
                mov     tic,mpb+11              ; 1 second hold
st71            mov     a,index
                jz      st72
                dec     index
st72            acall   oscdsp
                acall   tx                      ; initiate transmit
st70            acall   status
                acall   bar
                mov     a,tic
                jnz     st70
                mov     tic,mpb+16              ; .24 sec slew
                sjmp    st71
state8                                          ; SPEED UP
                mov     tic,mpb+11              ; 1 second
st80            mov     a,set
                add     a,mpb+4
                cjne    a,mpb+6,$+3
                jnc     st82                    ; clamp at max
                mov     set,a                   ; save new
st82            mov     a,set
                acall   rpmdsp                  ; display set
                acall   tx                      ; initiate transmit
st81            acall   status
                acall   bar
                mov     a,tic
                jnz     st81
                mov     tic,mpb+15              ; 40 msec slew
                sjmp    st80
stateB                                          ; INCREASE RATE
                mov     tic,mpb+11              ; 1 second hold
stB2            mov     a,index
                cjne    a,#9,stB0
                ajmp    stB3
stB0            inc     index
stB3            acall   oscdsp
                acall   tx                      ; initiate transmit
stB1            acall   status
                acall   bar
                mov     a,tic
                jnz     stB1
                mov     tic,mpb+16              ; .24 sec slew
                ajmp    stB2
stateC
                anl     iex1,#0F8h
                setb    ctrl.5
stC0            acall   watchdog
                acall   current                 ; R2R3 = amps
                mov     a,#20
                add     a,r2
                mov     r2,a
                clr     a
                addc    a,r3
                jnc     stC1
                mov     r2,#255
stC1            mov     pwm0,r2
```

```
            mov     a,p3
            anl     a,#30h              ; wait for release of buttons
            jz      stC0
            clr     ctrl.5
            mov     pwm0,#0             ; reset blade lock variables
            mov     posit,#0
            mov     dtac,#0
            orl     iex1,#7
            acall   calibrate           ; recalibrate footswitch
            ajmp    state ; TX waits for sio clear and initiates transmit
; KK950720 tx          mov     a,mode
            cjne    a,#6,tx1            ; jump if not oscillate mode
            mov     bank1+3,index       ; send index
            mov     bank1+4,#0
            sjmp    tx2
tx1         mov     a,rpm
            mov     b,mpb+10
            mul     ab                  ; binary set speed
            mov     bank1+3,a           ; speed low
            mov     bank1+4,b           ; speed high
tx2         mov     a,stat
            rr      a
            mov     bank1+5,a           ; state
            mov     bank1+6,mpb         ; device
tx0         mov     a,bank1             ; bank 1 r0
            cjne    a,#bank1+2,tx0      ; wait for reset pointer
            mov     sbuf,#81h           ; initiate
            ret ; USER preferences
; KK951010 user        mov     a,dsr               ; get last base address
            mov     r0,a                ; save last preferences
            mov     @r0,set
            add     a,#16
            mov     r0,a
            mov     @r0,index
            add     a,#16
            mov     r0,a
            mov     @r0,mode
            mov     a,mpb               ; get new device number
            add     a,#dsr+1
            mov     dsr,a               ; save new base address
            mov     r0,a
            mov     set,@r0
            add     a,#16
            mov     r0,a
            mov     index,@r0
            add     a,#16
            mov     r0,a
            mov     mode,@r0
            mov     r0,dsr
            mov     a,@r0               ; get speed
            cjne    a,mpb+5,$+3
            jc      g2                  ; compare with minimum
```

```
            cjne    a,mpb+6,$+3
            jnc     g2                      ; compare with maximum
            mov     b,mpb+4                 ; get incremental speed step
            div     ab                      ; must be evenly divisable
            mov     a,b
            jz      g1                      ; do not reload default if zero
g2          mov     set,mpb+3
g1          mov     a,index
            cjne    a,#10,$+3
            jc      g3
            mov     index,#5                ; use default
g3          mov     a,mode
            clr     c
            rrc     a
            jc      g5
            cjne    a,#4,$+3
            jc      g4
g5          mov     mode,#4                 ; default to forward
g4          ret ; SCALE16 scales 16 bit signed number 0 - 99.61% and sums result to r2r3
; KK950830 scale16     acall   lohi
            mov     a,lo16
            add     a,r2
            mov     r2,a
            mov     a,hi16
            addc    a,r3
            mov     r3,a                    ; r2r3 = r2r3 + r2r3
            ret
lohi
            jnb     hi16.7,scale            ; jump if not negative number
            acall   neg16
            acall   scale
neg16                                       ; lo16hi16 = -lo16hi16
            clr     c
            clr     a
            subb    a,lo16
            mov     lo16,a
            clr     a
            subb    a,hi16
            mov     hi16,a
            ret
scale                                       ; lo16hi16 = gain * lo16hi16 / 256
            mov     a,gain
            mov     b,lo16
            mul     ab
            mov     lo16,b
            mov     a,gain
            mov     b,hi16
            mul     ab
            add     a,lo16
            mov     lo16,a
            clr     a
            addc    a,b
            mov     hi16,a
            ret ; OSCDSP get oscillate values and display information
```

```
; KK940825 oscdsp  mov     a,mpb+6
        clr     c
        subb    a,#20
        mov     b,#9                    ; rpm = (max - 20) / 9 * index + 20
        div     ab
        mov     b,index
        mul     ab
        add     a,#20
        mov     rpm,a                   ; set up for velocity loop
        mov     b,mpb+7
        div     ab
        add     a,#10
        mov     lag,a
        mov     r0,#screen+8
        mov     @r0,#20h
        inc     r0
        mov     @r0,#20h
        inc     r0
        mov     @r0,#0FAh
        mov     a,index
        orl     a,#30h
        inc     r0
        mov     @r0,a
        inc     r0
        mov     @r0,#0F9h
        ret ; MESSAGE moves 4 byte string from ROM to RAM for the DISPLAY routine
; KK940811
;       Input: DPTR source pointer
;       Output: 4 characters at ram location SCREEN+9
;Registers:    R0 destination pointer
;              ACC message mov     r0,#screen+9            ; destination pointer
msg     clr     a
        movc    a,@a+dptr               ; get byte
        mov     @r0,a                   ; put byte
        inc     r0
        inc     dptr                    ; next byte
        cjne    r0,#screen+13,msg       ; last byte
        ret msg0    db      "675K"

; RPMDSP calculates set speed
; KK940825 rpmdsp  mov     a,set
jogdsp  mov     rpm,a                   ; set up for velocity loop
        mov     b,mpb+10
        mul     ab                      ; create rpm from set
        mov     r4,a
        mov     r5,b ; FORMAT converts 16 bit binary to display code data with zero suppression
; KK930624
;       Input: R4R5 lohi 16 bit number to convert
```

```
;   Output: 5 formatted characters at ram location SCREEN+8
;Registers: R0 pointer to first location in temporary buffer BANK3+2 + 4
;           R1 pointer to first location in screen buffer
;           R2R3 lohi registers for 16 bit math
;           R6 bcd digit index
;           ACC & BACC format  mov     r0,#bank3+2         ; use bank3 for temporary buffer
        mov     r2,#low 10000
        mov     r3,#high 10000
        acall   for0                ; count ten thousands
        mov     r2,#low 1000
        mov     r3,#high 1000
        acall   for0                ; count thousands
        mov     r2,#low 100
        mov     r3,#high 100
        acall   for0                ; count hundreds
        mov     a,r4
        mov     b,#10
        div     ab                  ; produce tens and ones
        acall   for2
        mov     a,b
        acall   for2
        mov     r0,#bank3+2         ; strip 4 leading zeros
for4    cjne    @r0,#30h,for3
        mov     @r0,#20h
        inc     r0
        cjne    r0,#bank3+6,for4
for3    mov     r0,#bank3+2
        mov     r1,#screen+8        ; copy to screen buffer
for5    mov     a,@r0
        mov     @r1,a
        inc     r0
        inc     r1
        cjne    r1,#screen+13,for5
        ret
for0
        clr     c                   ; subtract 16 bit number till
        mov     r6,#-1              ;   overflow
for1    mov     a,r4
        subb    a,r2
        mov     r4,a
        mov     a,r5
        subb    a,r3
        mov     r5,a
        inc     r6                  ; r6 counts number of times
        jnc     for1
        mov     a,r2                ; restore number in r4r5
        add     a,r4
        mov     r4,a
        mov     a,r3
        addc    a,r5
        mov     r5,a
        mov     a,r6
for2    orl     a,#30h              ; make printable character
        mov     @r0,a               ; write to temporary buffer
        inc     r0
        ret ;  UGN3055 reads hall addresses 1 through 8
```

```
; KK950912

UGN3055 mov     adcn,#6         ; hall bus on adc channel 6
        mov     halls,#0        ; initialize
        mov     magnet,#0
        setb    p0.6            ; Vlow
        acall   adc1            ; read Vlow
        add     a,#38
        mov     Iq,a            ; save quiescent current
next    clr     p0.6            ; Vhigh
        acall   adc1            ; read Vhigh
        cjne    a,Iq,$+3
        jc      notone
        mov     a,hmask
        orl     halls,a         ; indicate device present
notone  setb    p0.6            ; Vlow
        acall   adc1
        cjne    a,Iq,$+3
        jc      nomag
        mov     a,hmask
        orl     magnet,a        ; indicate magnet present
nomag   mov     a,hmask         ; rotate mask
        rl      a
        mov     hmask,a
        jnb     acc.0,next      ; loop until done
        setb    p0.7
        acall   adc1            ; reset
        clr     p0.7
        ret
adc1
        mov     a,#12           ; 25 usec delay
        djnz    acc,$
        orl     adcn,#8         ; start adc
wait1   mov     a,adcn
        jnb     acc.4,wait1
        anl     adcn,#0EFh      ; clear interrupt
        mov     a,adch
        ret ; BAR scales actual velocity to bargraph
; KK950730 bar     mov     r0,bb           ; address of offset vector
        mov     a,bank2+1       ; get actual velocity
        mov     b,mm
        mul     ab              ; scale velocity to 160 max
        mov     a,b
        add     a,@r0
        jc      bar1
        mov     b,xx
        mul     ab              ; bar = xx * (mm * tac + (bb))
        cjne    a,#160,$+3
        jc      bar0
bar1    mov     a,#160
bar0    mov     b,#10
        div     ab              ; calculate blocks in acc
        mov     r2,a
        mov     a,b
        mov     b,#3
        div     ab              ; calculate number of lines
```

```
            mov     r3,a
            mov     r0,#screen+23       ; bargraph buffer
            mov     a,r2
            jz      part
whole       mov     @r0,#0F8h           ; write blocks to buffer
            inc     r0
            djnz    r2,whole
part        mov     a,r3
            jz      none
            add     a,#0F5h             ; offset to number of lines
            mov     @r0,a               ; write lines to buffer
            inc     r0
none        cjne    r0,#screen+39,space
            ret
space       mov     @r0,#20h            ; fill the rest with spaces
            inc     r0
            sjmp    none ; VELOCITY handles brushless motor velocity vector requirements
; KK930712
;   R0: floating target velocity for loop
;   R1: dtac
;   R2R3: proportional term -> derivative term
;   R4R5: integral term
;   R6R7: proportional term jog         acall   commutate
            ret
velocity                                ; timer 0 reset before vectoring here
            jb      ctrl.5,jog
            setb    ie0                 ; initiate display send interrupt
            push    acc
            push    psw
            push    b
            setb    rs1                 ; use register bank 2 mov     a,tic               ; general purpose timer for other
            jz      v0                  ;   routines
            dec     tic
            clr     a
v0
            xch     a,dtac              ; get and reset (no interrupt trouble)
            mov     r1,a                ; save for velocity loop
            jb      ctrl.0,wrong_way
            mov     a,target            ; velocity target from footswitch
            jz      v2
            mov     b,rpm               ; selected motor speed
            mul     ab
            inc     b                   ; scaled target velocity in b ; velocity profiler with direction control mov     a,r0                ; velocity loop command compared to
            cjne    a,b,$+5             ;   new target
            ajmp    v3
            jc      increase
            subb    a,mpb+7             ; decrease
            jc      v5
            cjne    a,b,$+3
            jc      v5                  ; IF carry clamp at b ELSE use new a
```

19

```
v2         mov     r0,a
           ajmp    v3
increase
           add     a,mpb+7
           jc      v5
           cjne    a,b,$+3
           jc      v2                      ; IF carry use new a ELSE clamp at b
v5         mov     r0,b
           ajmp    v3
wrong_way
           mov     a,r0
           cjne    a,mpb+8,$+3             ; reverse velocity
           jc      change
           clr     c
           subb    a,mpb+7
           jnc     v2
           mov     r0,#0
           ajmp    v3
change
           xrl     ctrl,#3                 ; tell commutate to change direction ; TPIDAO velocity loop -> K0 * T + K1 * P + K2 * I + K3 * D + K4 * A + O v3         mov     a,r0                    ; get target loop velocity
           jnb     ctrl.4,v9               ; check for blade lock request
           jnz     v9
           setb    ctrl.2                  ; lock
           mov     a,mpb+9
           clr     c
           rrc     a
           cjne    a,posit,$+3
           jc      vA                      ; use positional error if R0 = 0
           mov     a,posit
           sjmp    vB
vA         mov     a,mpb+9
           clr     c
           subb    a,posit
vB         rrc     a
           mov     r0,a
           jz      v4
v9         clr     c                       ; calculate proportional term
           subb    a,r1                    ; subtract actual tac value
           mov     r2,a
           clr     a
           subb    a,#0
           mov     r3,a                    ; R2R3 = P
           jbc     ctrl.3,v6               ; leave integral term alone if I limit
           mov     a,r4                    ; low byte of integral term
           add     a,r2                    ; add low byte of proportional term
           mov     r4,a
           mov     a,r5                    ; high byte of integral term
           addc    a,r3                    ; add high byte of proportional term
           mov     r5,a                    ; R4R5 = I
           jnb     ov,v6
           jnc     v7
           mov     r4,#0
           mov     r5,#80h                 ; clamp at minimum
           sjmp    v6
v7         mov     r4,#0FFh
           mov     r5,#7Fh
```

20

```
v6       clr     c
         mov     a,r1                    ; calculate derivative term
         subb    a,r6
         mov     r6,a
         clr     a
         subb    a,#0
         mov     r7,a                    ; R6R7 = D
         mov     lo16,r2
         mov     hi16,r3
         mov     r2,#0
         mov     r3,#0
         mov     a,r0
         jz      vc
         mov     r2,#15                  ; O
vc       mov     gain,#63                ; P
         acall   scale16                 ; R2R3 = K1 * P + O
         mov     lo16,r6
         mov     hi16,r7
         mov     gain,#63                ; D
         acall   scale16                 ; R2R3 = K1 * P + K3 * D + O
         mov     r6,bank2+1              ; save for derivative term calculation
         mov     lo16,r0
         mov     hi16,#0
         mov     gain,#63                ; T
         acall   scale16                 ; R2R3 = K0 * T + K1 * P + K3 * D + O
         mov     lo16,amp
         mov     hi16,amp+1
         mov     gain,#63                ; A
         acall   scale16     ; R2R3 = K0 * T + K1 * P + K3 * D + K4 * A + O
         mov     lo16,r4
         mov     hi16,r5
         mov     gain,#63                ; I
         acall   scale16; R2R3 = K0 * T + K1 * P + K2 * I + K3 * D + K4 * A + O
         jnb     ov,v8
         jnc     too_big                 ; signed number overflow
         sjmp    v4
v8       jz      ok                      ; torque limit
         jnb     acc.7,too_big
v4       mov     r2,#0
         mov     r4,#0
         mov     r5,#0                   ; reset integral term
         mov     r6,#0                   ; reset proportional term
         sjmp    ok1
too_big
         mov     r2,#0FFh
         sjmp    ok2

; torque limit ok       mov     a,r1                    ; get actual tac
         mov     b,#39
         mul     ab
         mov     a,r1                    ; create maximum allowable pwm
         add     a,b
         jc      ok1
         add     a,mpb+12
         jc      ok1
         cjne    a,bank2+2,$+3           ; compare with r2
         jnc     ok1
         mov     r2,a                    ; clamp @ 1.156 * TAC + mpb+12
```

```
ok2         anl     ctrl,#0EBh              ; release blade lock and request
            setb    ctrl.3                  ; indicate current limit
            mov     a,r1
            jz      v4
ok1         mov     pwm0,r2
            pop     b
            pop     psw
            pop     acc
            reti ; COMMUTATE runs off the CT interrupts
; KK930701 commutate
            push    acc
            push    psw
c1          mov     a,p1                    ; 0 and 7 are invalid returns
            cjne    a,p1,c1
            anl     a,#7                    ; 3 phase mask
            xch     a,new                   ; save hall patterns
            xch     a,old
            cjne    a,new,c2                ; direction has changed if equal
            xrl     rotate,#0FFh            ; negate if direction changed
            inc     rotate
c2          jb      ctrl.2,c3               ; check for blade lock
            jnb     ctrl.1,c6               ; check for reverse direction
c3          mov     a,posit
            jnz     c6
            clr     ctrl.1
            xrl     dir,#38h                ; change direction on zero
c6          mov     a,new
            add     a,dir                   ; offset to data table
            movc    a,@a+pc                 ; get byte from table
            mov     pX,a                    ; output with 2 hi bits set
            inc     dtac                    ; increment dynamic tac
            mov     a,posit
            add     a,rotate                ; track position
            jnb     acc.7,c4
            mov     a,mpb+9                 ; fix underflow
            dec     a
            sjmp    c5
c4          cjne    a,mpb+9,c5
            clr     a                       ; fix overflow
c5          mov     posit,a                 ; save shaft position
            pop     psw
            pop     acc
            mov     tm2ir,#0
            reti db      0FFh,0CBh,0ECh,0CEh,0F2h,0E3h,0F8h,0FFh ; commutation forward
            db      0FFh,0F8h,0E3h,0F2h,0CEh,0ECh,0CBh,0FFh ; commutation reverse ; DISPLAY sends screen buffer to 2X20 VFD
; KK950811 display
            push    psw
            orl     psw,#18h                ; register bank 3
            cjne    r0,#screen+41,d1
            mov     r0,#screen              ; reset
```

```
            sjmp    d2
i1          clr     p1.3                    ; strobe in data
            mov     p2,@r0                  ; put data on bus
            inc     r0
            setb    p1.3
d2          pop     psw
            reti ; SIO serial EP emmulation
; KK950707
; Serial mode 1 -> SCON = 0111XXXX use SM2 to receive packet. When SM2 = 0
;                           check that RB8 = 1 meaning valid stop received.
;
; 1200 baud, 8N1 uart
; Receive: 3 byte packet- sync, cmd, cksum (r2)
; R1: buffer pointer
; Transmit: 6 byte packet- sync, speedlo, speedhi, state, blade, cksum (r3-r7)
; R0: buffer pointer sio         push    acc
            push    psw
            setb    rs0                     ; register bank 1
            jbc     ti,xmit                 ; transmit, else receive
            clr     ri                      ; clear interrupt indicator
            jnb     sm2,receive             ; sync or data byte receive
            mov     a,sbuf                  ; get character from receive buffer
            cjne    a,#0C5h,sio_end         ; return if not sync byte
            mov     r1,#bank1+2             ; set pointer (r2)
            clr     sm2                     ; prepare to receive data byte
            sjmp    sio_end
receive
            jnb     rb8,rx_done             ; abort if not valid stop bit
            cjne    r1,#bank1+3,char        ; go to incoming character processor
            mov     a,sbuf
            add     a,r2                    ; make checksum
            add     a,#0C5h
            jnz     rx_done                 ; zero else error
            mov     serial,r2               ; make available to main process
rx_done
            setb    sm2                     ; restore wait for sync mode
sio_end
            pop     psw
            pop     acc
            reti
char
            mov     @r1,sbuf                ; put character in receive buffer
            inc     r1                      ; bump rx pointer
            sjmp    sio_end
xmit
            inc     r0                      ; bump tx pointer
            cjne    r0,#bank1+8,notdone     ; test for last character
            mov     r0,#bank1+2             ; reset tx pointer (r2)
            mov     r7,#81h                 ; initialize checksum with sync
            sjmp    sio_end
notdone
            cjne    r0,#bank1+7,tx_data     ; send data bytes ELSE
            mov     a,r7                    ;   send checksum
            cpl     a
            inc     a                       ; two's complement
            mov     sbuf,a
            sjmp    sio_end
```

```
x_data
        mov     a,@r0                   ; get byte
        mov     sbuf,a                  ; send byte
        add     a,r7
        mov     r7,a                    ; update checksum
        sjmp    sio_end ipc     db      0Eh                     ; cursor off
        db      18h,0F6h,10h,40h,0,80h,0        ;
        db      18h,0F7h,11h,44h,0,88h,0        ;
        db      18h,0F8h,51h,44h,80h,88h,2      ; >
        db      18h,0F9h,0,0Fh,5Ah,0Ah,0Fh      ; <
        db      18h,0FAh,3Ch,94h,16h,3Ch,0      ;

;Data Format:   mpb0-device ID, mpb1-timer low, mpb2-timer high
;               mpb3-default speed, mpb4-incremental speed
;               mpb5-minimum speed, mpb6-maximum speed, mpb7-acceleration
;               mpb8-reverse velocity, mpb9-commutations per revolution
;               mpb10-set speed scale factor, mpb11-1 sec timer prescaler
;               mpb12-torque limit data1   db      low(3-40000),high(3-40000),120,4,4,201,20,40,60,25,25,60
data2   db      low(3-40000),high(3-40000),80,4,2,141,20,40,60,25,25,255
data3   db      low(3-40000),high(3-40000),100,2,4,161,20,40,30,50,25,160
data4   db      low(3-40000),high(3-40000),60,2,4,101,20,40,30,50,25,160
data5   db      low(3-40000),high(3-40000),40,1,4,61,20,40,30,50,25,160 db      'ESPV10 by Ken Krause. (c) 1995 Smith & Nephew Dyonics. '
        db      'Andover MA 01810. All rights reserved.' end
```

What is claimed is:

1. A surgical system adapted to operate with at least one surgical device, said surgical system having a handpiece containing a motor and adapted to receive and drive said surgical device, said surgical device being driven through a continuum of positions by said handpiece, said system comprising a controller, a motor drive circuitry driving said surgical device, said controller controlling said drive circuitry, a switch bus, addressable switches in said handpiece connected to said switch bus and responsive to electrical address signals from the controller over said switch bus for indicating a switch presence and a switch condition, and said controller being responsive to electrical signals from said switches over the switch bus for controlling operation of said motor drive.

2. The surgical system of claim 1 wherein each said addressable switch comprises a Hall-effect sensor, and a moveable switch element containing a magnet, and said controller is responsive to a change of state of said Hall-effect sensors for operating said motor drive.

3. The surgical system of claim 1 further comprising at least one addressable Hall-effect device in electrical signal communications with said bus, and positioned in said handpiece for responding to magnetic field generating elements in a surgical device inserted into said handpiece, and said controller being responsive to signals indicative of a state of said at least one addressable Hall-effect device for presetting parameters corresponding to said surgical device.

4. The surgical system of claim 3 wherein said switch bus is a two wire bus connecting to each Hall-effect device.

5. A surgical system adapted to operate with at least one surgical device, said surgical system having a handpiece containing a motor and adapted to receive and drive said surgical device, said surgical device being driven through a continuum of positions by said handpiece, said system comprising a controller, a motor drive circuitry driving said surgical device, said controller controlling said drive circuitry, a two wire switch bus, addressable switches, including at least one addressable Hall-effect device connected to and in electrical signal communcations with said bus, in said handpiece connected to said switch bus and responsive to electrical address signals from the controller over said switch bus for indicating a switch presence and a switch condition, and positioned in said handpiece for responding to magnetic field generating elements in a surgical device inserted into said handpiece, and said controller being responsive to electrical signals from said switches over the switch bus for controlling operation of said motor drive, said controller being responsive to signals indicative of a state of said at least one addressable Hall-effect device for presetting parameters corresponding to said surgical device, a foot switch connected to the controller for providing electrical signals identifying various foot switch commands, said foot switch including, an addressable switch having a Hall-effect switch and an actuating button element for modifying the state of the Hall-effect switch, said foot switch indicating to the controller, when polled, a switch state, and said controller, in response to said switch state, controlling operation of said motor.

* * * * *

UNITED STATES PATENT AND TRADEMARK OFFICE
CERTIFICATE OF CORRECTION

PATENT NO. : 5,804,936
DATED : September 8, 1998
INVENTOR(S) : Michael A. Brodsky, Kenneth W. Krause It is certified that error appears in the above-identified patent and that said Letters Patent is hereby corrected as shown below:

Column 3, line 39, after "14B" insert --,--.

Column 8, line 19, before "board" insert --circuit--.

Column 8, line 52, after "Hall-effect" insert --sensor--.

Column 9, line 3, after "100d," insert --and--.

Column 9, line 49, before "provides" insert --operation--.

Column 10, 46, after "defaults" insert --to--.

Column 11, line 11, after "or" insert --footswitch,--.

Column 12, line 55, replace "FIG. 14" with --FIGS. 14a and 14b--.

Signed and Sealed this

Ninth Day of March, 1999

*Attest:*

Q. TODD DICKINSON

*Attesting Officer*    *Acting Commissioner of Patents and Trademarks*